(12) United States Patent
Gao

(10) Patent No.: US 9,927,004 B2
(45) Date of Patent: Mar. 27, 2018

(54) GEAR-DRIVE ADAPTER WITH SELF-ALIGNING CATCHING MECHANISM

(71) Applicant: Bradshaw Medical, Inc., Kenosha, WI (US)

(72) Inventor: Hua Gao, Fox Point, WI (US)

(73) Assignee: Bradshaw Medical, Inc., Kenosha, WI (US)

( * ) Notice: Subject to any disclaimer, the term of this patent is extended or adjusted under 35 U.S.C. 154(b) by 627 days.

(21) Appl. No.: 14/051,693

(22) Filed: Oct. 11, 2013

(65) Prior Publication Data
US 2015/0101432 A1   Apr. 16, 2015

(51) Int. Cl.
| | | |
|---|---|---|
| B25B 17/00 | (2006.01) | |
| F16H 1/28 | (2006.01) | |
| B25B 15/04 | (2006.01) | |
| B25B 17/02 | (2006.01) | |

(52) U.S. Cl.
CPC ............... *F16H 1/28* (2013.01); *B25B 15/04* (2013.01); *B25B 17/02* (2013.01); *Y10T 74/19614* (2015.01)

(58) Field of Classification Search
CPC ... B25B 21/002; B25B 23/0035; B25B 17/00; B25B 17/02; B25B 15/04; F16H 1/28; Y10T 74/19614

USPC .......... 81/57, 57.3, 57.31, 57.32, 58.1, 58.3, 81/57.42; 475/176–178
See application file for complete search history.

(56) References Cited

U.S. PATENT DOCUMENTS

| | | | | |
|---|---|---|---|---|
| 2,780,944 A | * | 2/1957 | Ondeck ................... | B25B 17/00 408/124 |
| 8,122,788 B2 | * | 2/2012 | Gauthier ................. | B25B 15/04 81/57.31 |
| 2012/0109126 A1 | * | 5/2012 | Steele ................ | A61B 17/7076 606/53 |

* cited by examiner

*Primary Examiner* — Hadi Shakeri
(74) *Attorney, Agent, or Firm* — Absolute Technology Law Group, LLC

(57) ABSTRACT

A gear-driver adapter configured to switch between at least two gear ratios includes a switch which exerts a force on a drive shaft to move the drive shaft between at least two positions, each corresponding to a gear ratio, in an epicyclic gear system created by a main gear body, ball driver and gear holder with gears. The drive shaft contains keyed structures and, depending on its position within the gear system, the keyed structures on the drive shaft engage or disengage a plurality of key stops. The key stops, in turn, interact with the gears to generate the desired gear ratio. The contours of the keyed structures on the gear holder allow the drive shaft to move between positions without first being specifically positioned. The gear-driver adapter also includes a handle adapter and a driver adapter, allowing users to use any handle or driver with the gear-driver adapter.

17 Claims, 23 Drawing Sheets

Apertures 103

GEAR-DRIVE ADAPTER WITH SELF-ALIGNING CATCHING MECHANISM

FIELD OF INVENTION

The present invention relates to the field of medical drivers, and more specifically to a gear-driver adapter for medical tools.

TERMS OF ART

Figure 1:
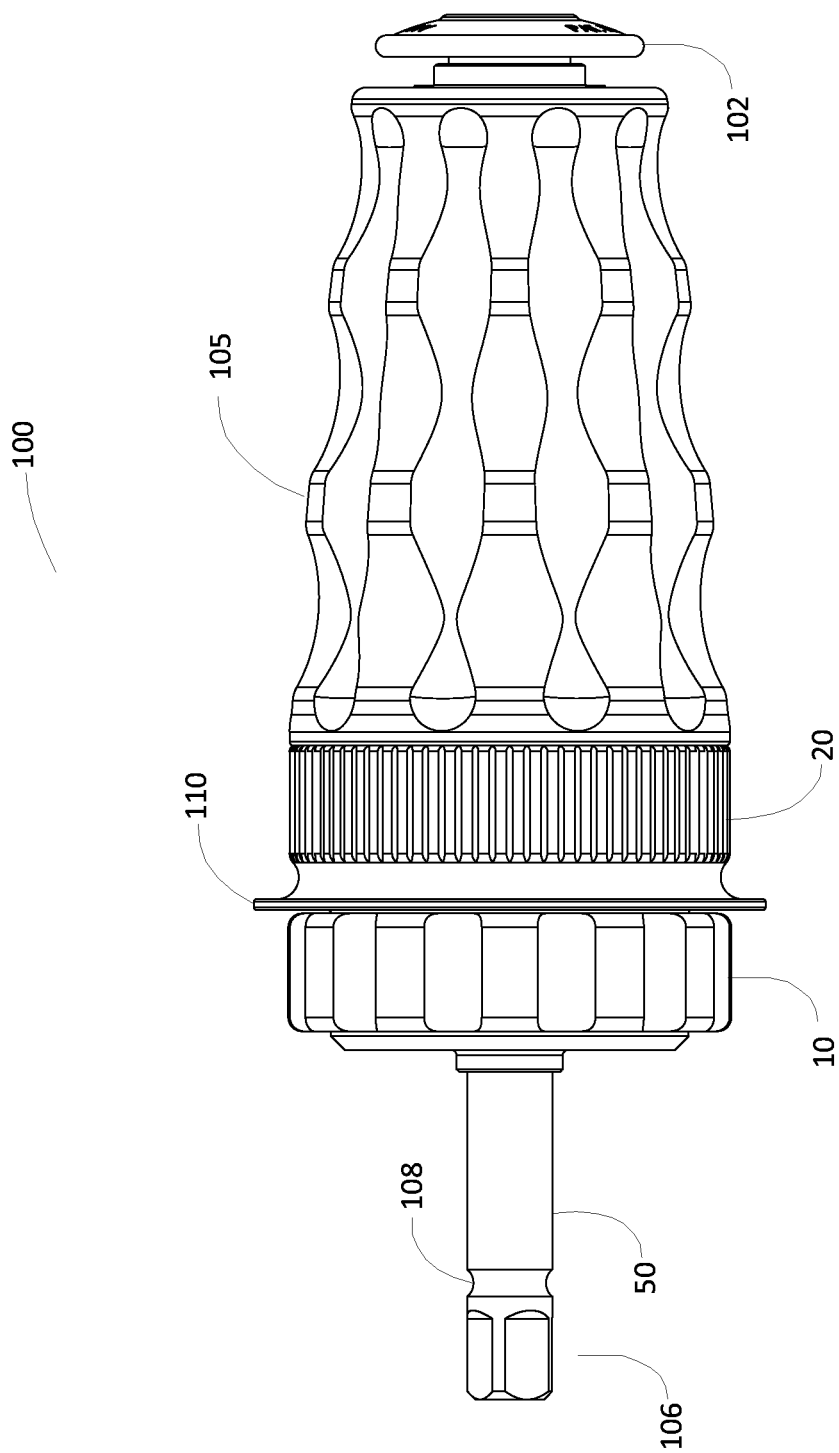
FIG. 1 illustrates an exemplary gear-driver adapter with a tool adapter.

As used herein, the term "adapter" refers to a component of an orthopedic tool handle which engages a tool.

As used herein, the term "chamfer" refers to a beveled, angled or tapered edge which engages the edge of a second component to create a secured junction.

As used herein "geometric" or "geometric contour" "geometrically contoured" refers to the characteristic of a component structurally adapted or conforming to the specifications, dimensions or geometric features of a corresponding component. An engaging contour is a type of contour which securely and/or selectively engages two or more component parts and is a critical feature of a system or apparatus.

As used herein, the terms "flattened" refers to a structural characteristic of a geometric feature of a component. A flattened or partially flattened geometric feature may contain a single area or multiple areas of lesser curvature.

As used herein, the term "gear" refers to any rotating structure having teeth, cogs, or other protuberance or combination of protuberances which interact or mesh with another component to transmit torque.

As used herein, the term "gear ratio" refers to the ratio of the number of rotations made by a driving gear to the number of rotations made by a driven gear. For example, a gear ratio of 3:1 means that for every one rotation of a driving gear, the driven gear makes three rotations.

As used herein, the term "keyed structure" refers to a physical structure on and part of an object which allows it to geometrically engage and disengage interact with a second object in only one manner. Keyed structures include protuberances, contoured or flattened surfaces, lips, edges, chamfers, grooves, channels, interlocking components, male and female components, and any other structure or combination of these and other structures which allow to objects to specifically interact.

BACKGROUND

Drivers are handles used to turn medical implants, screws or other components during surgery. Typical drivers require a complete turn of the handle to complete one turn of the tool shaft. As a result, doctors spend significant amounts of time turning and tightening components, which puts strain on the medical instruments, patent and the surgeon's hand, wrist and arm.

Gear-drivers are known in the art and allow surgeons to turn a driver fewer rotations to complete tightening of a component. For example, gear-drivers have a 2:1 gear ratio require only a single turn of the driver to complete 2 turns of the tool shaft. Gear-drivers therefore allow surgeons and patients to spend less time in surgery, and decrease the amount of strain on the surgeon.

One problem with gear-drivers known in the art is the lack of flexibility. Surgeons require both straight drivers and gear-drivers to complete tasks, which requires two separate tool handles. A surgeon must therefore either have two identical tools, resulting in more equipment to prepare and sterilize for surgery, or change handles in the middle of procedures.

It is desirable to create a driver handle that allows a surgeon the flexibility to switch between straight driving and using an increased gear ratio.

It is further desirable to create a gear-driver which may be interchanged with multiple handles.

SUMMARY OF THE INVENTION

The present invention is a variable speed gear driver adapter system comprised of a housing enclosing a variable gear assembly including at least two gears and at least one main gear drive shaft and at least one ball drive shaft. The system includes a driver-receiving adapter wherein said driver receiving adaptor is adapted with contours to engage said at least one ball drive shaft, wherein said at least one ball drive shaft has engaging contours which are adapted to securely engage at said at least one driver receiving adapter.

The system further includes an an interchangeable handle having an contoured interior chamber which is geometrically adapted to receive and securely engage said main gear drive shaft.

The present invention is a gear-driver adapter with a self-aligning catching mechanism. The gear-driver adapter includes a switch which exerts a force on a drive shaft to move the drive shaft between at least two positions, each corresponding to a gear ratio, in an epicyclic gear system created by a main gear body, ball driver and gear holder with gears. The drive shaft contains keyed structures and, depending on its position within the gear system, the keyed structures on the drive shaft engage or disengage a plurality of key stops. The key stops, in turn, interact with geared components of the gear system to generate the desired gear ratio.

The gear-driver adapter also includes a handle adapter and a driver adapter, allowing users to use any handle or driver with the gear-driver adapter.

DETAILED DESCRIPTION OF INVENTION

For the purpose of promoting an understanding of the present invention, references are made in the text to exemplary embodiments of a gear-driver adapter, only some of which are described herein. It should be understood that no limitations on the scope of the invention are intended by describing these exemplary embodiments. One of ordinary skill in the art will readily appreciate that alternate but functionally equivalent structures and materials may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

It should be understood that the drawings are not necessarily to scale; instead, emphasis has been placed upon illustrating the principles of the invention. In addition, in the embodiments depicted herein, like reference numerals in the various drawings refer to identical or near identical structural elements.

FIG. 1 illustrates a side view exemplary variable gear-driver adapter 100 for use with a surgical instrument and customized handle.

Figure 2:
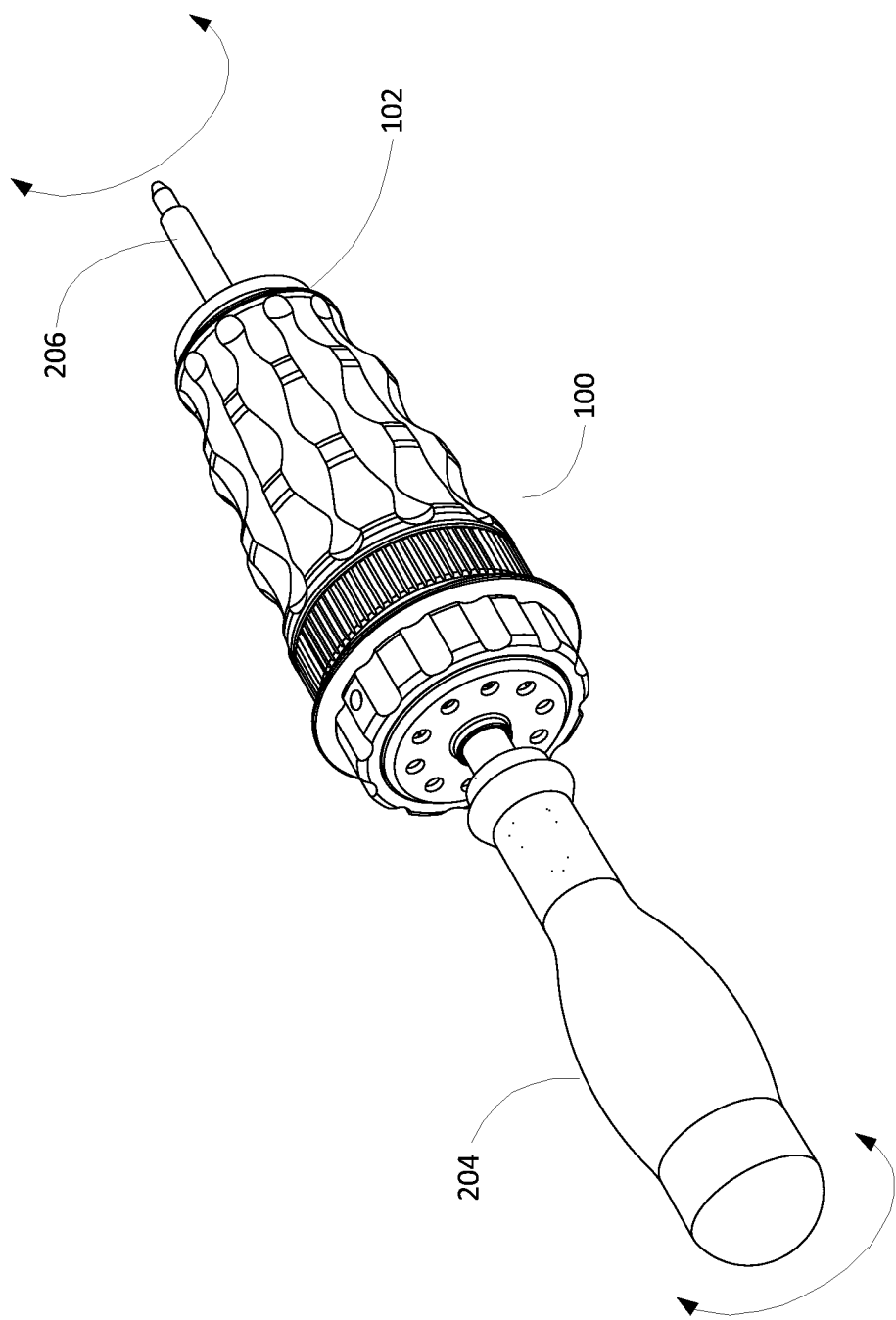
FIG. 2 illustrates an exemplary gear-driver adapter with an attached handle and tool.

FIG. 2 shows gear-driver adapter system 200 in use with interchangeable handle 204 which is adapted to connect securely to variable gear-driver adapter 100. In the embodiment shown interchangeable handle 204 and and gear-driver adapter 100 have corresponding mechanical engagements. In the embodiment shown, the engagements are on drive shaft 50 and the interior surface of component of interchangeable handle 204 (not shown). The mechanical engagements may conform to specifications for the corresponding geometry. In the embodiment shown, drive shaft 50 which includes at lease flattened protrusion which engages the interior surface of are comprised of corresponding interlocking contoured complements.

Tool 206 is attached at the front portion of gear-driver adapter 100 at also includes geometry comprised of corresponding interlocking contoured components.

As illustrated in FIG. 1, handle 204 may be rotated in either direction, resulting in rotational movement of tool 206 in the same direction. In further exemplary embodiments, rotation of handle 204 may be turned in only one direction.

In still further exemplary embodiments, handle 204 may be rotated in either direction while tool 206 is configured to turn in only one direction.

In the exemplary embodiment shown, gear-driver adapter 100 may operate at either a 1:1 gear ratio or a 3:1 gear ratio. When operating at a 1:1 gear ratio, a single turn of handle 204 causes a single turn of tool 206. When operating at a 3:1 gear ratio, a single turn of handle 204 causes three complete turns of tool 206.

In further exemplary embodiments, gear-driver adapter 100 may be configured to operate at any gear ratio, although the range of gear ratios which may be used with gear-driver adapter 100 may be limited by reasonable size constraints of handle 204, gear-driver adapter 100 and tool 206. In most exemplary embodiments, gear-driver adapter 100 may be configured to operate at a minimum of two gear ratios between 1:5 and 8:1, where a 1:5 ratio provides 1 complete rotation of tool 206 for every 5 rotations of handle 204 and a 8:1 ratio provides 8 complete rotations of tool 206 for every rotation of handle 204.

In still further exemplary embodiments, gear-driver adapter 100 may be configured to switch between more than two gear ratios.

FIG. 2 illustrates an exemplary gear-driver adapter 100. Gear-driver adapter 100 includes a rear end having drive shaft 50 and a front end having tool adapter 102. As illustrated, drive shaft 50 has handle securing portion 106, which is flattened and/or squared having groove 108, allowing gear-driver adapter 100 to be connected to any square driver handle known in the art. In further exemplary embodiments, drive shaft 50 may be any configuration known in the art which may be compatable with driver handles known in the art.

Similarly, tool adapter 102 is an internal adapter having a release collar, as known in the art. However, further exemplary embodiments may use an tool adapter known in the art, including external adapters. Tool adapter 102 may be configured to receive any tool known in the art.

Gripping handle 105 is illustrated as a contoured surface. In further exemplary embodiments, gripping handle 105 may contain any variety of contours and be made of any material which facilitates gripping and provides a comfortable and stable grip. Shoulder 110 provides a separation between selecting ring 10 and cover 20.

Figure 3:
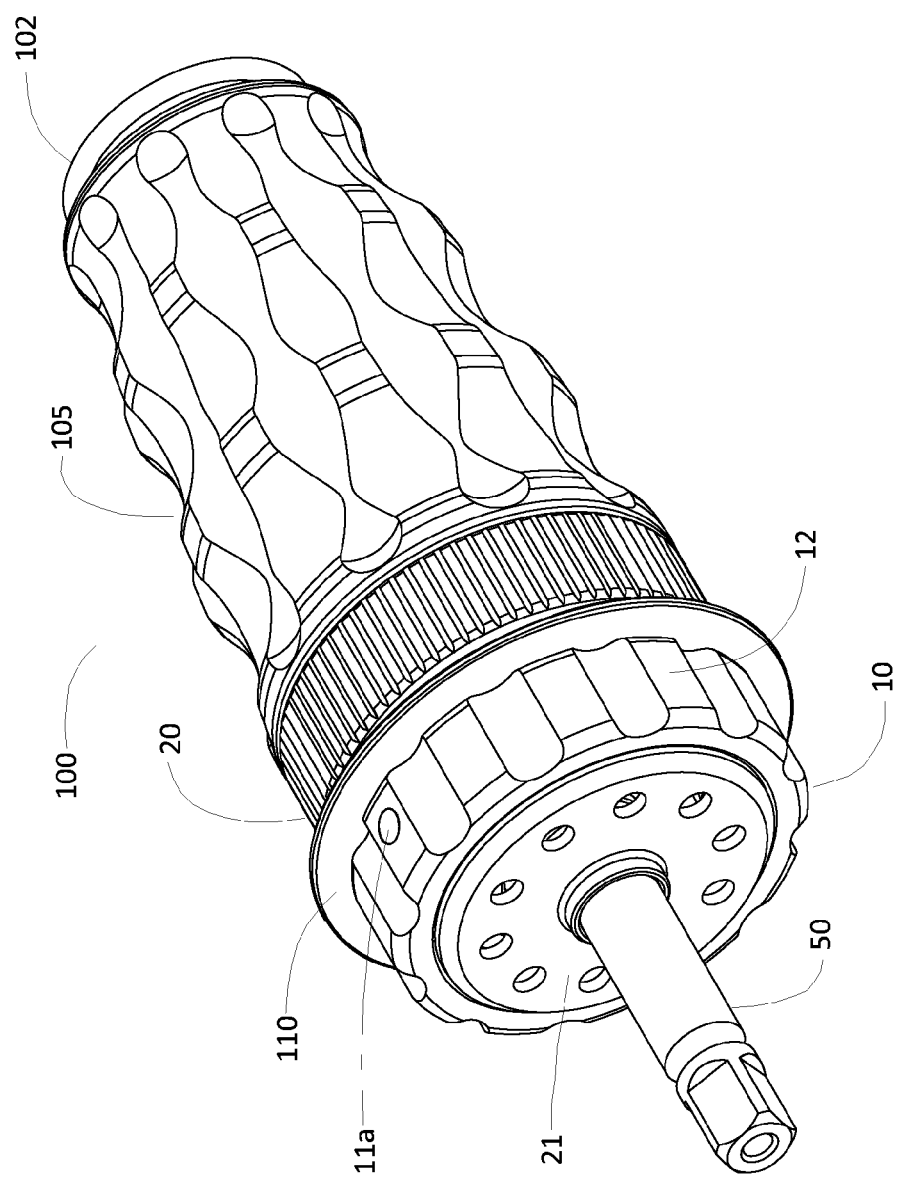
FIG. 3 illustrates an exemplary gear-driver adapter with handle connector.

FIG. 3 illustrates an exemplary gear-driver adapter 100 showing drive shaft 50. Rear face 21 of cover 20 is visible through selecting ring 10, with one of the dual pins 11a set in gripping surface 12 of selecting ring 10.

Collar 110 separates gripping surface 12 of selecting ring 10 from cover 20 and gripping handle 105.

Figure 4:
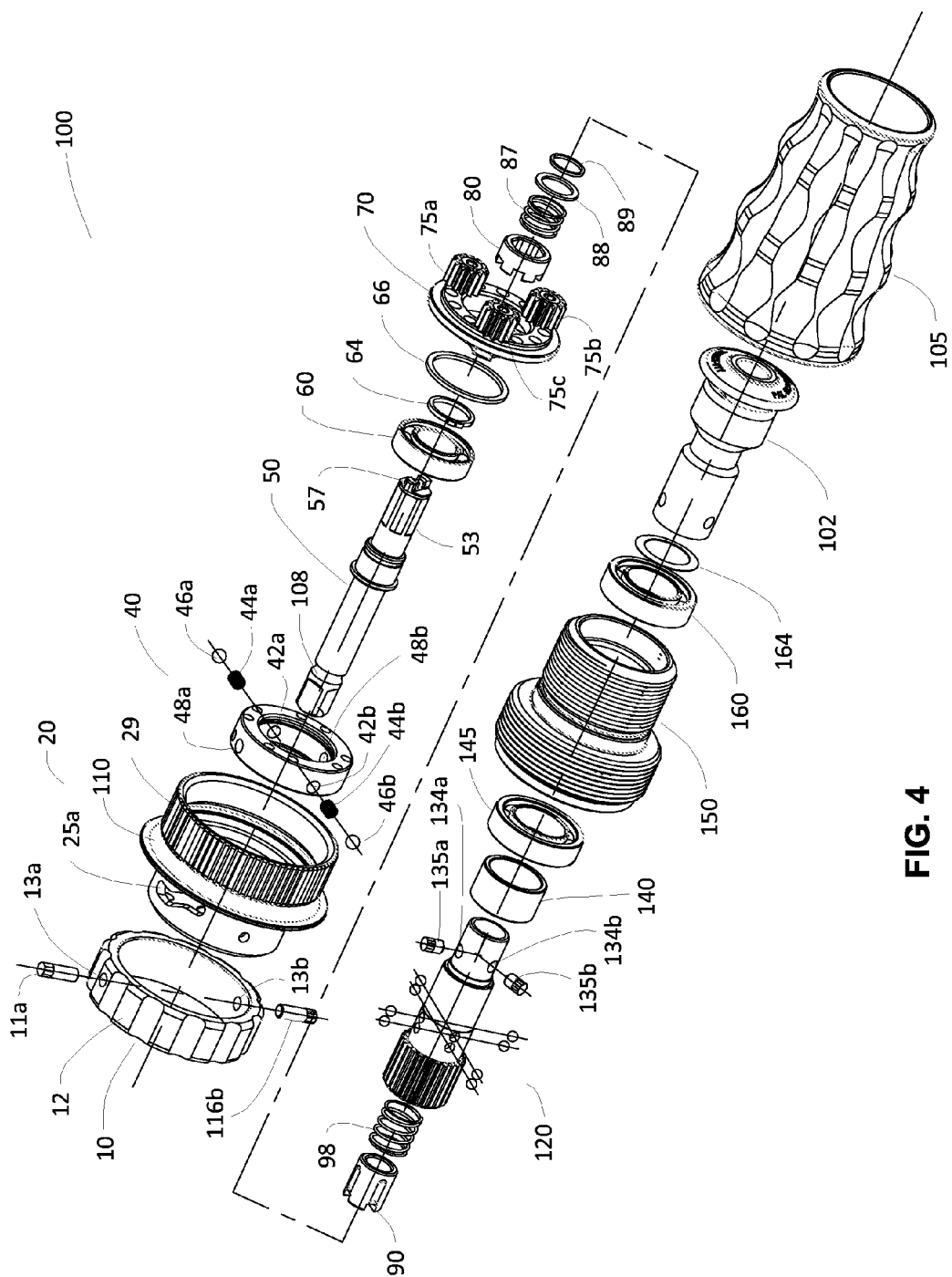
FIG. 4 is an exploded view illustrating the switch and engaging keyed components of an exemplary gear-driver adapter.

FIG. 4 is an exploded view illustrating the switch and engaging keyed components of an exemplary gear-driver adapter 100. As illustrated in the exemplary embodiment shown, gear-driver adapter 100 includes selecting ring 10 with pins 11a, 11b and gripping surface 12. Pins 11a, 11b project through corresponding pin apertures 13a, 13b in gripping surface 12. Cover 20 with shoulder 110 includes slots 25a, 25b (not shown) and grooved outer surface 29.

Switch 40 includes securing ball apertures 42a, 42b, each corresponding to a spring 44a, 44b, respectively, and a securing ball 46a, 46b, respectively. Switch 40 also contains pin apertures 48a, 48b, which correspond to pins 11a, 11b, respectively.

In the exemplary embodiment shown, apertures 42a, 42b, springs 44a, 44b and securing balls 46a, 46b are symmetrically disposed around switch 40, with an even number each of apertures, springs and securing balls. However, in further exemplary embodiments, switch 40 may contain any number of apertures, springs and securing balls, and, in some exemplary embodiments, the number of apertures, springs and securing balls may be proportional to the size of gear-driver adapter 100. In still further exemplary embodiments, apertures, springs and securing balls may be asymmetrically arranged.

Drive shaft 50 with groove 108 has hexagonal surface 53 with keyed front end 57.

Gear holder 70 secures gears 75a, 75b, 75c. Key stop 80 corresponds to hexagonal surface 53 of drive shaft 50, while key stop 90 corresponds with keyed front end 57 of drive shaft 50. Spring 87 is secured between key stop 80 and key stop 90, and key stop 90 secures spring 98 within ball driver 120.

Ball driver 120 includes a plurality of apertures 132a, 132b, 132g, 132h, 132c, 132d, 132e, 132f (shown in detail in FIG. 13) for retaining balls 130a, 130b, 130c, 130d, 130e, 130f, 130g, 130h (shown in detail in FIG. 13) and pin apertures 134a, 134b for locking pins 135a, 135b.

Main gear body 150 has an interior surface containing a plurality of teeth corresponding to the surface of ball driver 120.

In the exemplary embodiment shown, the inner surface of main gear body 150, gears 75a, 75b, 75c and ball driver 120 act as an epicyclic gearing system in which the inner surface of main gear body 150 is an annulus, gear holder 70 is a planet carrier, gears 75a, 75b, 75c are planet gears, and ball driver 120 is the central, or sun, gear. In the epicyclic gearing system described, main gear body 150, or the annulus, is held stationary, with input rotation provided by the planetary gears, or gears 75a, 75b, 75c, and the ball driver 120, or sun gear, produces the output rotation.

In the current exemplary embodiment described, this arrangement results in a 3:1 increase in gear ratio, meaning ball driver 120, or the sun gear, rotates 3 times for each rotation of gears 75a, 75b, 75c, or the planet gears. In further exemplary embodiments, main gear body 150, gears 75a, 75b, 75c and ball driver 120 may be of different sizes or have different numbers of teeth. In still further exemplary embodiments, gear holder 70 may include more or fewer planet gears. The gear ratio may be increased or decreased by modifying these factors.

When pins 11a, 11b of selecting ring 10 engage the portion of slots 25a, 25b nearest rear face 21 of cover 20, gear-driver adapter 100 is operating with a 3:1 gear ratio. Drive shaft 50 is released into a rear position such that spring 87 is able to provide a rearward pressure on key stop 80, causing it to engage gear holder 70.

Spring 98, which is housed with ball driver 120 when assembled, exerts a rearward pressure on key stop 90, which causes key stop 90 to engage retaining balls 130a, 130b, 130c, 130d, 130e, 130f, 130g, 130h of ball driver 120.

As drive shaft 50 is rotated, key stop 80 follows and causes gear holder 70 to rotate as well. The rotation of gear holder 70 causes gears 75a, 75b, 75c to rotate about ball driver 120 and within main gear body 150, which has an inner surface containing a plurality of teeth (not shown), causing ball driver 120, and subsequently key stop 90, to rotate as well.

When pins 11a, 11b of selecting ring 10 engage the portion of slots 25a, 25b furthest from rear face 21 of cover 20, gear-driver adapter 100 is operating with a 1:1 gear ratio. Forward pressure exerted by cover 20 causes drive shaft 50 to be pushed forward, pushing key stop 80 forward and disengaging it from gear holder 70. Keyed front end 57 of drive shaft 50 engages key stop 90, which engages retaining balls 130a, 130b, 130c, 130d, 130e, 130f, 130g, 130h of ball driver 120.

As drive shaft 50 rotates, key stop 80 rotates with drive shaft 50, but does not rotate gear holder 70. Drive shaft 50 also causes key stop 90 to rotate, which causes ball driver 120 to rotate. Because gear holder 70 is, in essence, bypassed, the resulting output rotation from ball driver 120 is equal to the input rotation.

Figure 5A:
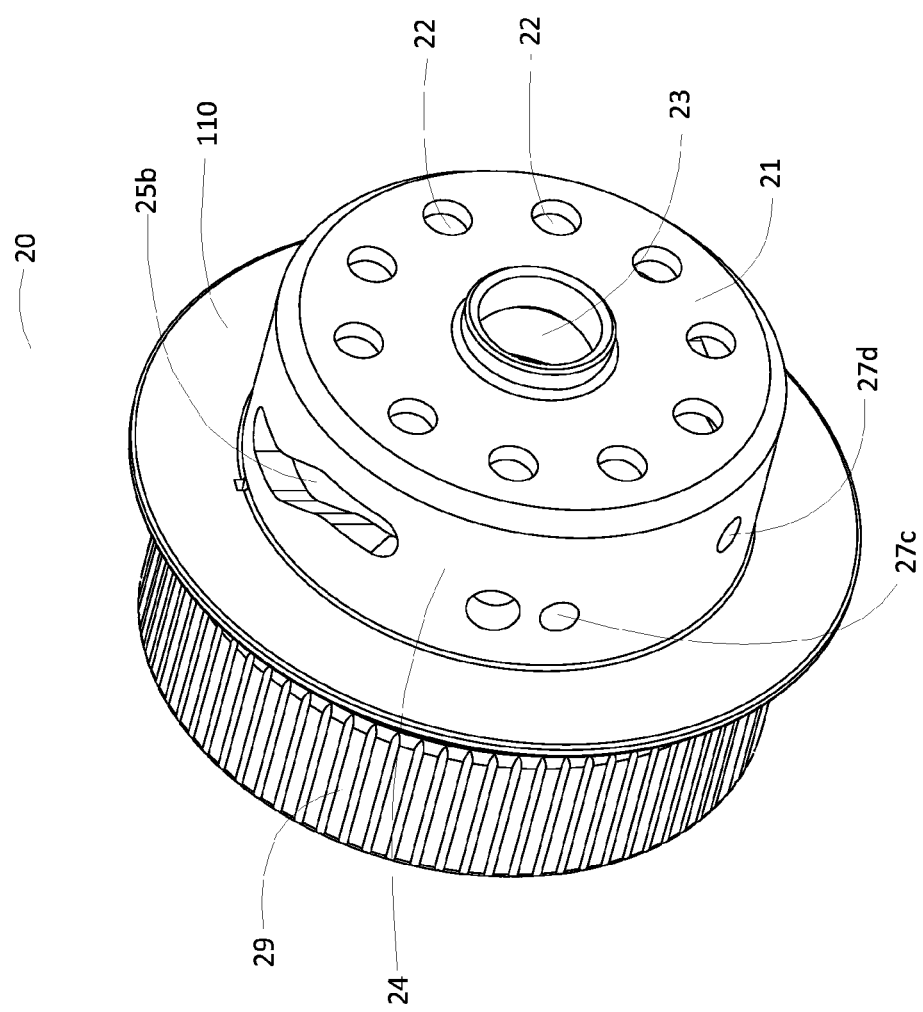
FIGS. 5a and 5b illustrate an exemplary cover component for a gear-driver adapter.
Figure 5B:
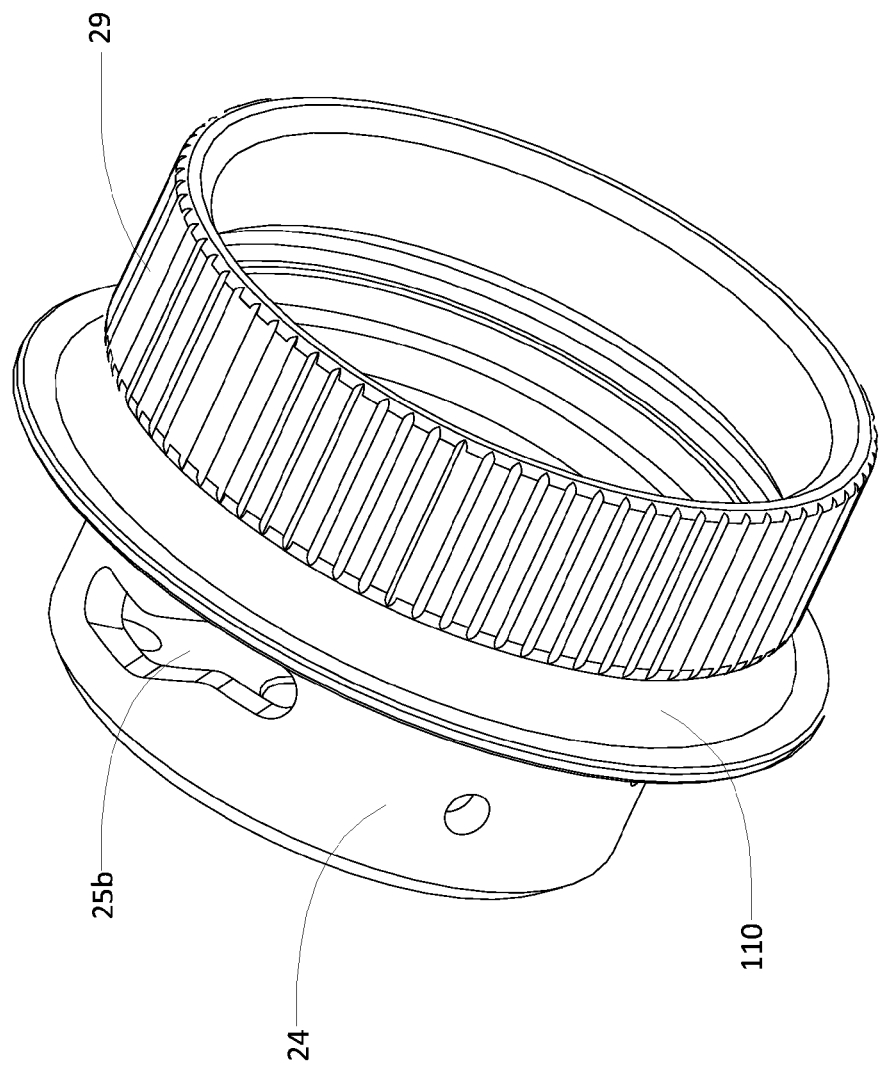

FIGS. 5a and 5b illustrates an exemplary cover component 20 for gear-driver adapter 100 (not shown). Cover 20 contains rear face 21 containing a plurality of drainage apertures 22. Drainage apertures 22 allow cleaning solution and water, as well as any debris or other particulates, to drain from gear-driver adapter 100 (not shown) during cleaning and sterilization. Rear face 21 also includes central drive shaft aperture 23 which has an internal diameter slightly larger than the external diameter of drive shaft 50 (not shown), allowing cover 20 to slide easily along drive shaft 50 (not shown).

Cover 20 transitions to perpendicular surface 24 which contains segmented slots 25a, 25b and securing ball apertures 27a, 27b, 27c, 27d. Slot 25b is symmetrically arranged opposite slot 25a, and securing ball apertures 27c, 27d are symmetrically arranged oppose retaining ball apertures 27a, 27b.

In the exemplary embodiment shown, segmented slots 25a, 25b each contain three distinct segments consisting of two substantially straight portions (one nearer grooved outer surface 29 and one further from grooved outer surface 29), which are parallel to each other, connected by a middle angled transition segment. Each substantially straight and parallel segment corresponds to one selectable gear ratio. In further exemplary embodiments, segmented slots 25a, 25b may contain additional segmented portions to allow transition between more than two gear ratios.

As illustrated, securing ball apertures 27a, 27b, 27c, 27d occur in pairs, with each pair (27a, 27b and 27c, 27d) corresponding to one of slots 25a, 25b, respectively. Slots 25a, 25b have two flattened portions with an angled transition between them, with one flattened portion occurring nearer to the rear of cover 20 (e.g., nearer rear face 21), while the second flattened portion occurs nearer to front of cover 20 (e.g., nearer grooved outer surface 29). Each pair of securing ball apertures 27a, 27b and 27c, 27d is similarly staggered such that one of the pairs of securing ball apertures 27a and 27c are in line with the rear flattened portion of slots 25a, 25b while the other of the pairs of securing ball apertures 27b and 27d is aligned with the front flattened portion of slots 25a, 25b.

As a result, when pins 11a, 11b (not shown) engage slots 25a, 25b, respectively, at the front flattened portions, securing balls 46a, 46b (not shown) engage the first of the pairs of securing ball apertures (27a, 27c respectively). When selecting ring 10 (not shown) is rotated to position pins 11a, 11b (not shown) at the rear flattened portions, securing balls 46a, 46b (not shown) engage the second of the pairs of securing ball apertures (27b, 27d respectively). Securing balls 46a, 46b (not shown), therefore, act as a locking mechanism to keep gear-driver adapter 100 (not shown) secured in position.

The inner diameter of cover 20 at the area of perpendicular surface 24 corresponds to the outer diameter of switch 40 (not shown), while the inner diameter of cover 20 at grooved outer surface 29 corresponds to the outer diameter of the threaded outer surface 152 (not shown) of main gear body 150 (not shown). The inner surface of cover 20 at grooved outer surface 29 is also threaded to correspond to threaded outer surface 152 (not shown) of main gear body 150 (not shown).

When switch 40 (not shown) is assembled with cover 20, bearing 60 (not shown) secures springs 44a, 44b (not shown) between bearing 60 (not shown) and securing balls 46a, 46b, (not shown) respectively, such that springs 44a, 44b (not shown) are continually providing an outward force on securing balls 46a, 46b (not shown). Securing balls 46a, 46b (not shown) are secured between springs 44a, 44b (not shown) and perpendicular surface 24 of cover 20.

As selecting ring 10 (not shown) is rotated, with pins 11a, 11b (not shown) engaging pin apertures 48a, 48b (not shown) and slots 25a, 25b, switch 40 (not shown) is rotated with selecting ring 10 (not shown). When pins 11a, 11b (not shown) are aligned with the portion of slots 25a, 25b nearest rear face 21, springs 44a, 44b (not shown) force securing balls 46a, 46b (not shown) into securing ball apertures 27a, 27c. As selecting ring 10 (not shown), and therefore switch 40 (not shown) is rotated so that pins 11a, 11b are aligned with the portion of slots 25a, 25b furthest from rear face 21, springs 44a, 44b (not shown) force securing balls 46a, 46b (not shown) into securing ball apertures 27b, 27d.

Figure 6:
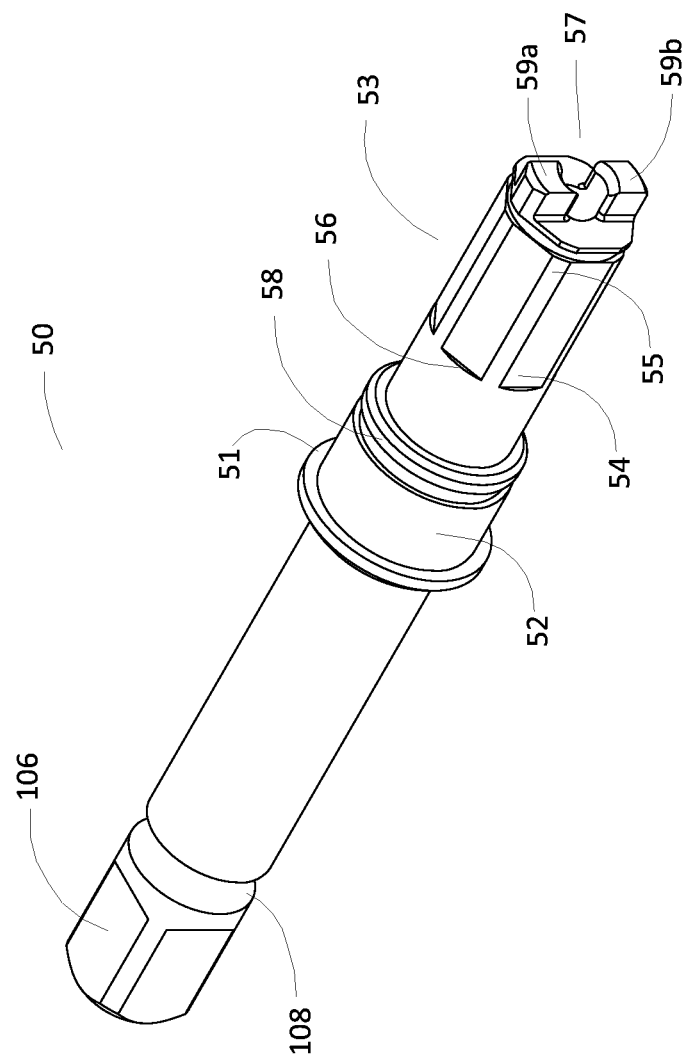
FIG. 6 is an exemplary embodiment of a drive shaft.

FIG. 6 is an exemplary embodiment of drive shaft 50. As illustrated, drive shaft 50 has handle securing portion 106 with four flattened surfaces separated by rounded transitions. Handle securing portion 106 is specifically manufactured to engage and secure to a specific tool handle. Groove 108 also serves to secure drive shaft 50 to a given tool handle. In further exemplary embodiments, handle securing portion 106 may be any configuration specifically designed to engage and secure to a specific handle. Groove 108 may or may not be required to help drive shaft 50 engage a handle.

Stop ridge 51 occurs approximately two-thirds of the way along drive shaft 50 from handle securing portion 106, and transitions drive shaft 50 to smooth bearing surface 52. Retaining ring groove 58 secures retaining ring 64 (not shown) to hold bearing 60 (not shown) on drive shaft 50 when gear-driver adapter 100 (not shown) is assembled.

The end opposite handle securing portion 106 contains hexagonal surface 53 with keyed end 57 consisting of two key protuberances 59a, 59b. Hexagonal surface 53 includes six flattened surfaces 54 alternated between curved transitions 55. Each flattened surface 54 includes a stop chamfer 56.

Figure 7A:
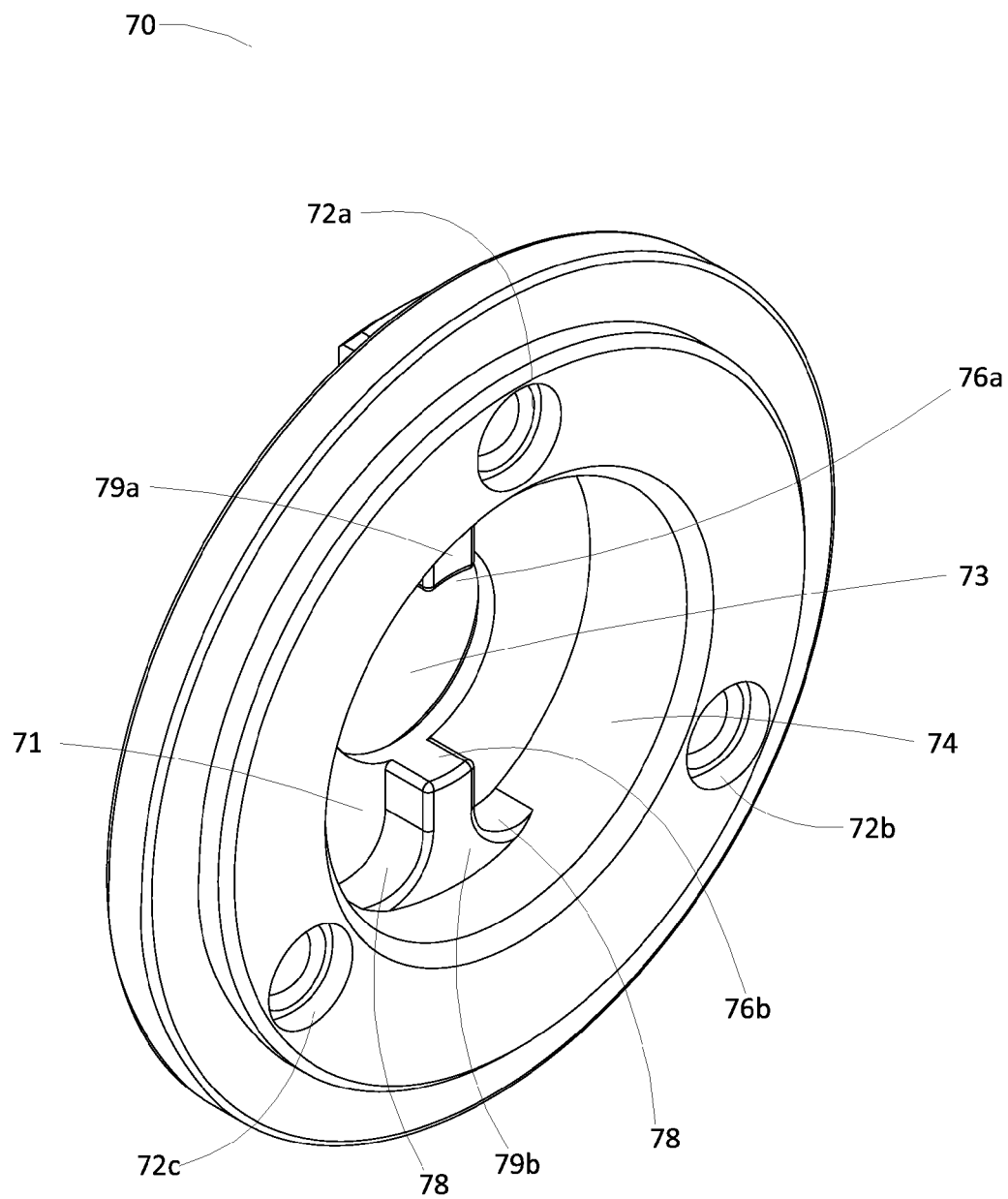
FIGS. 7a and 7b illustrate an exemplary gear holder for a gear-driver adapter.
Figure 7B:
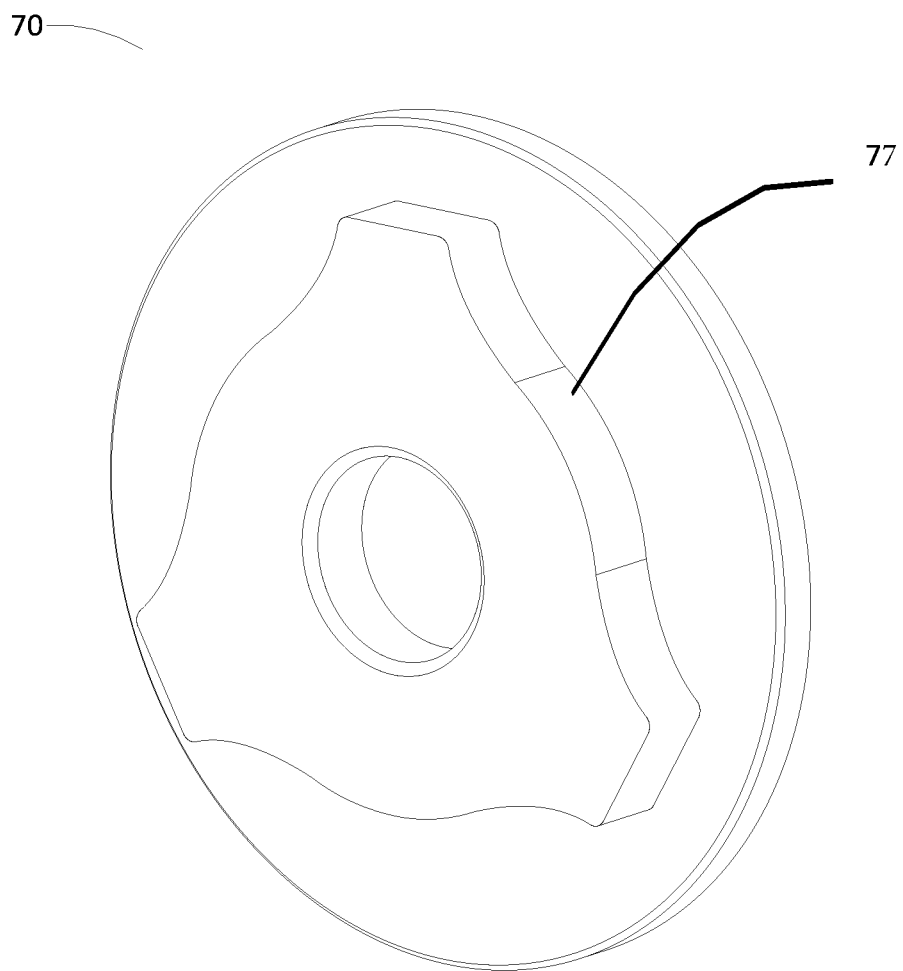

FIG. 7a is a front view of an exemplary gear holder 70 with gears 75a, 75b, 75c (not shown) removed to expose gear connection apertures 72a, 72b, 72c. FIG. 7b is a rear view of an exemplary gear holder 70 with gears 75a, 75b, 75c (not shown) removed.

Gears 75a, 75b, 75c (not shown) connect to gear holder 70 through pin-style connections which secure through gear connection apertures 72a, 72b, 72c. However, in further exemplary embodiments, gears 75a, 75b, 75c (not shown) may use any structure or device known in the art to secure to gear holder 70.

Drive shaft aperture 73 is centrally located in gear holder 70, and has an inner diameter just larger than the outer diameter of drive shaft 50 (not shown) to permit free rotation and axial movement of drive shaft 50 (not shown) within drive shaft aperture 73.

Flattened surface 71 around drive shaft aperture 73 transitions gear holder 70 to a cavity of larger diameter defined by wall 74. The cavity defined by wall 74 and flattened surface 71 has an inner diameter larger than the outer diameter of ball driver 120 (not shown). Flattened surface 71 and wall 74 also have two keyed protuberances 79a, 79b, each having a curved smooth surface 76a, 76b. Curved smooth surfaces 76a, 76b are curved at a radius corresponding to the radius of drive shaft 50 (not shown).

Self-aligning transitions 78 provide a transition between wall 74 and keyed protuberances 79a, 79b. As will be shown in FIGS. 12a and 12b, keyed protuberances 79a, 79b correspond to keyed recesses 82 (not shown) of key stop 80 (not shown). Regardless of the orientation of gear holder 70 relative to key stop 80, self-aligning transitions 78 allow keyed protuberances 79a, 79b to quickly and easily engage one pair of keyed recesses 82 (not shown) on key stop 80 (not shown) by slidingly rotating gear holder 70 and key stop 80 (not shown) relative to each other.

As illustrated in FIG. 7b, gear connection apertures 72a, 72b, 72c each have a corresponding thickened portion 77, through which gears 75a, 75b, 75c are connected using a pin-style connection. Gears 75a, 75b, 75c may be permanently or integrally attached to a pin-type connector, or a pin-type structure, such as a screw, pin, bolt, rod or other connector, may be passed through both gears 75a, 75b, 75c and thickened portion 77.

Figure 8:
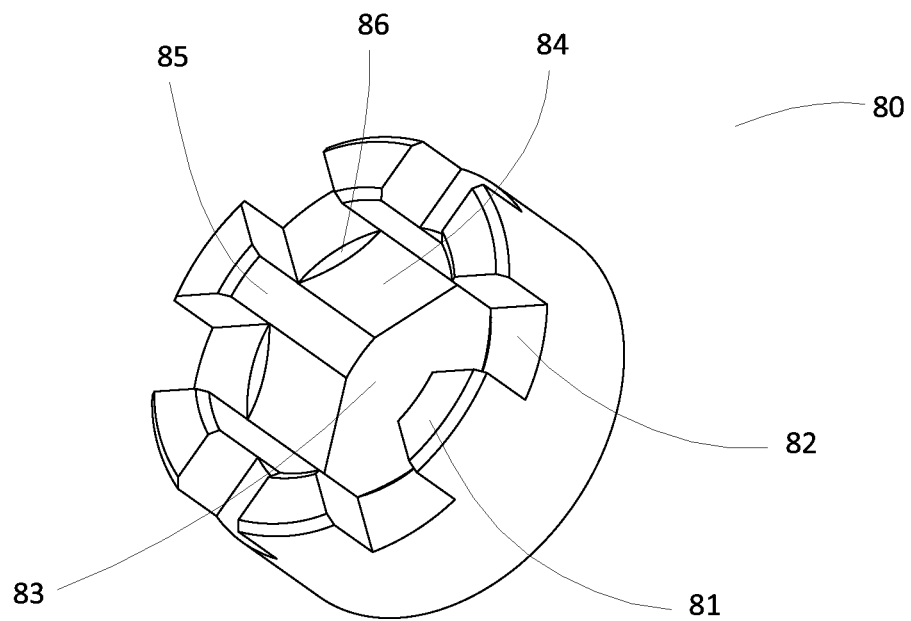
FIG. 8 illustrates an exemplary first key stop.

FIG. 8 illustrates an exemplary key stop 80. Key stop 80 includes a plurality of protuberances 81 alternated with keyed recesses 82 with a central drive shaft aperture 83. The inner diameter of key stop 80 is just larger than the outer diameter of drive shaft 50 (not shown) to permit easy axial movement of drive shaft 50 (not shown) within key stop 80.

The inner surface of key stop 80 includes a plurality of flattened surfaces 84, each having a stop chamfer 86, alternated with a plurality of curved segments 85. As illustrated, flattened surfaces 84 occur with keyed recesses 82, while curved segments 85 occur with protuberances 81.

In the exemplary embodiment shown, key stop 80 contains six protuberances 81 and six keyed recesses 82 with six corresponding flattened surfaces 84 and curved segments 85. Flattened surfaces 84 engage flattened surfaces 54 (not shown) on drive shaft 50 (not shown), while curved segments 85 engage curved transitions 55 (not shown) of drive shaft 50 (not shown). The engagement of these components prevents key stop 80 from rotating around drive shaft 50 (not shown), while still permitting axial movement of drive shaft 50 (not shown) in key stop 80.

Figure 9A:
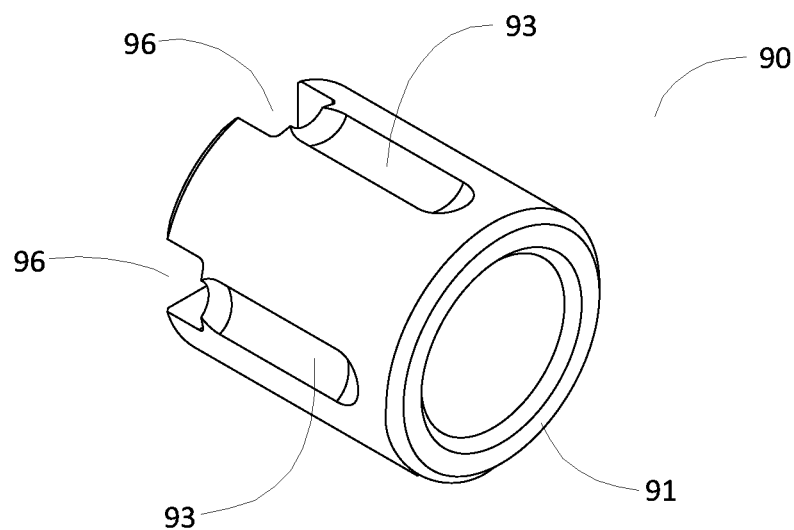
FIGS. 9a and 9b illustrate an exemplary second key stop.
Figure 9B:
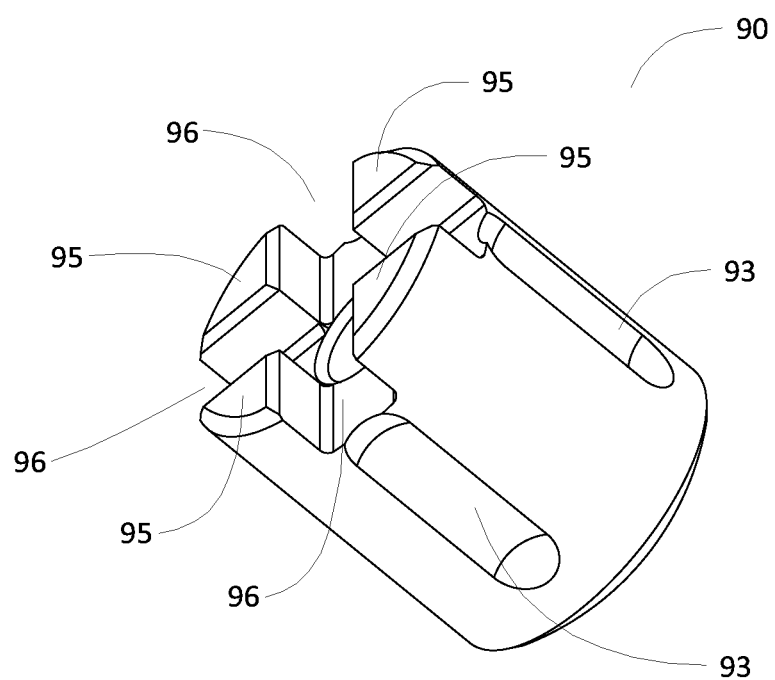

FIGS. 9a and 9b illustrate an exemplary second key stop 90 used with a gear-driver adapter 100 (not shown). As illustrated in FIGS. 9a and 9b, key stop 90 is a hollow structure with spring-contact surface 91. Key stop 90 also includes four retaining ball channels 93 which engage retaining balls 130a, 130b, 130c, 130d, 130e, 130f, 130g, 130h (not shown) and allow retaining balls 130a, 130b, 130c, 130d, 130e, 130f, 130g, 130h (not shown) to slide within retaining ball channels 93.

In the exemplary embodiment shown, there are four retaining ball channels 93, each corresponding to one pair of retaining balls. However, in further exemplary embodiments, the number of retaining ball channels 93 may vary dependent on the number of retaining ball pairs. While retaining ball channels 93 are shown symmetrically disposed around key stop 90, in further exemplary embodiments, retaining ball channels 93 may be arranged around key stop 90 in an asymmetrical manner.

Key protuberances 95 create keyed recesses 96 creating an 'X' over the surface of key stop 90. Keyed recesses 96 correspond to key protuberances 59a, 59b (not shown) of drive shaft 50 (not shown). Key protuberances 59a, 59b (not shown) engage only one of keyed recesses 96, and providing two keyed recesses 96 in the 'X'-like shape allows key protuberances 59a, 59b (not shown) to quickly and easily engage a keyed recess 96 no matter the orientation of drive shaft 50 (not shown) relative to key stop 90.

In other exemplary embodiments, more or fewer keyed recesses 96 may be provided. In still further exemplary embodiments, drive shaft 50 (not shown) may contain a keyed structure other than key protuberances 59a, 59b (not shown), and key stop 90 may be similarly changed or modified to include a structure or recess which corresponds to and engages drive shaft 50 (not shown).

When key protuberances 59a, 59b (not shown) of drive shaft 50 (not shown) engage a keyed recess 96 of key stop 90, turning of the drive shaft 50 (not shown) causes key stop 90 to rotate with drive shaft 50 (not shown). When key stop 90 similarly engages retaining balls 130a, 130b, 130c, 130d, 130e, 130f, 130g, 130h (not shown), ball driver 120 (not shown) also rotates with drive shaft 50 (not shown).

Figure 10:
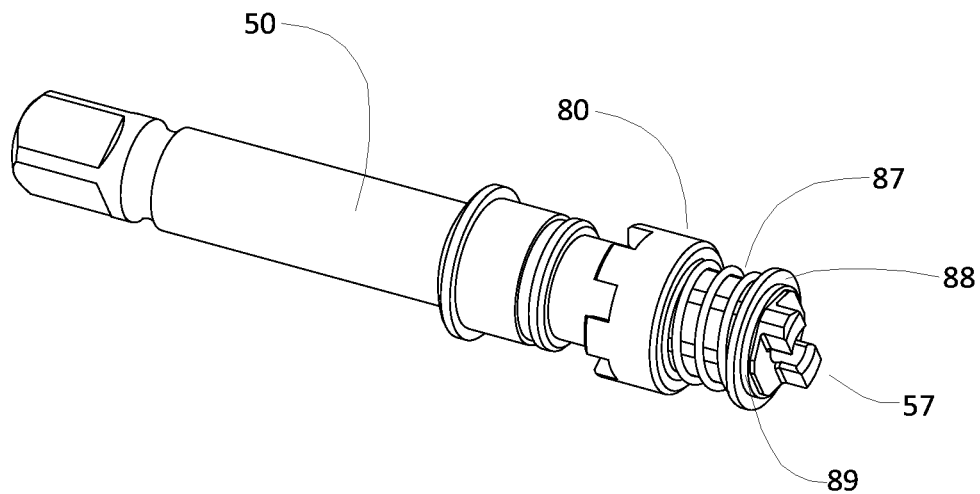
FIG. 10 illustrates an exemplary first key stop engaging a drive shaft for a gear-driver adapter.

FIG. 10 illustrates an exemplary first key stop 80 engaging a drive shaft 50 for a gear-driver adapter 100 (not shown). As illustrated, key stop 80 is shown slid over hexagonal surface 53 (not shown) of drive shaft 50. Inner flattened surfaces 84 (not shown) of key stop 80 are in physical contact with flattened surfaces 54 (not shown) of drive shaft 50, with curved segments 85 (not shown) of key stop 80 engaging curved transitions 55 (not shown) of drive shaft 50, preventing rotational movement of key stop 80 around drive shaft 50.

Key stop 80 is prevented from moving further up along drive shaft 50 by stop chamfers 56 (not shown) on hexagonal surface 53 (not shown) of drive shaft 50. As key stop 80 is moved upward along drive shaft 50, stop chamfers 86 (not shown) of key stop 80 come in physical contact with stop chamfers 56 (not shown) of drive shaft 50, preventing any further upward movement of key stop 80 along drive shaft 50.

Also shown in FIG. 10 are spring 87, washer 88 and retaining ring 89. Spring 87 exerts a force on key stop 80 to keep key stop 80 with stop chamfers 86 engaging stop chamfers 56 of drive shaft.

Figure 11:
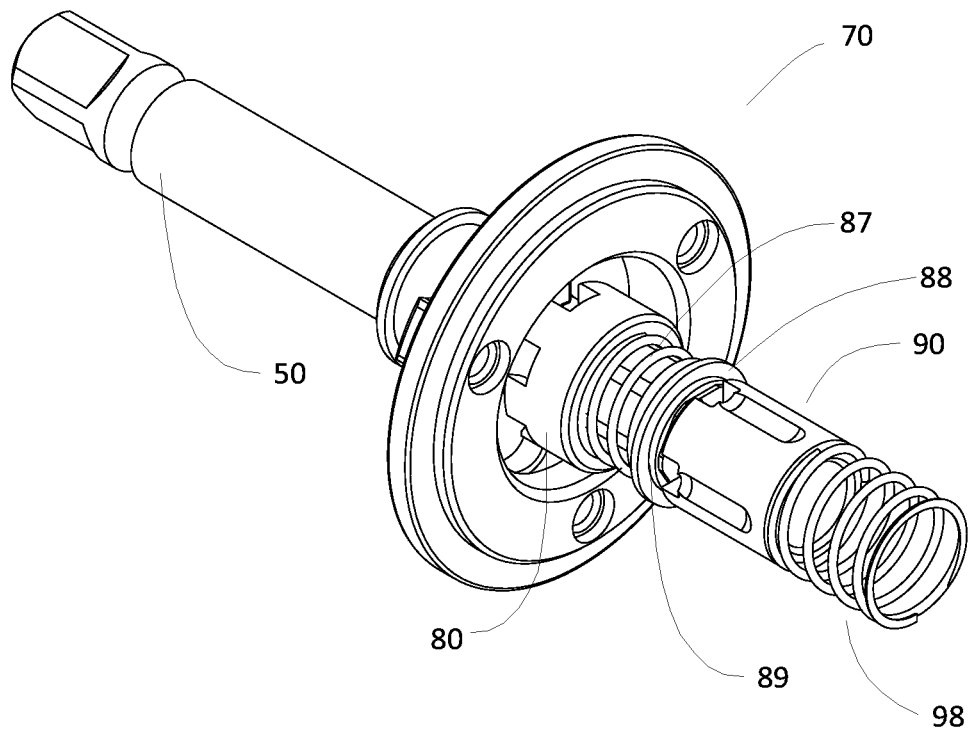
FIG. 11 illustrates a drive shaft for a gear-driver adapter assembled with each keyed component.

FIG. 11 illustrates an exemplary drive shaft 50 for a gear-driver adapter 100 (not shown) assembled with both key stops 80, 90. Gear holder 70, shown without gears 75a, 75b, 75c (not shown), is slid on drive shaft 50 between retaining ring groove 58 (not shown) and hexagonal surface 53 (not shown). Key stop 80 is slid on hexagonal surface 53 (not shown) with flattened surfaces 84 (not shown) engaging flattened surfaces 54 (not shown) of drive shaft 50. Key stop 80 is also shown engaging keyed protuberances 79a, 79b (not visible) of gear holder 70.

Because key stop 80 engages both flattened surfaces 54 (not shown) of drive shaft 50 and keyed protuberances 79a, 79b (not shown) of gear holder 70, when drive shaft 50 is rotated, key stop 80, and, subsequently, gear holder 70, follow.

Key stop 90 is shown after spring 87, washer 88 and retaining ring 89, with second spring 98 following.

Figure 12A:
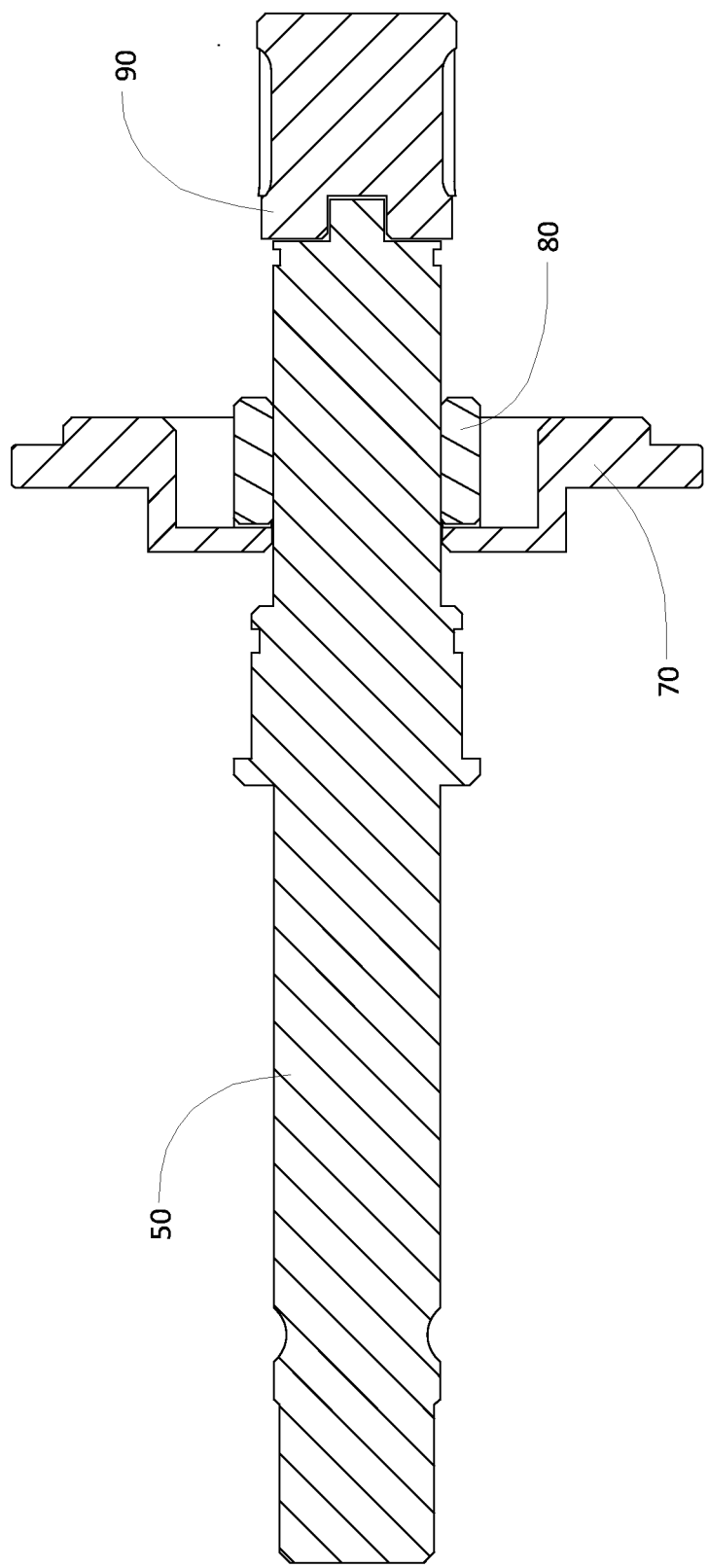
FIG. 12a is a cross-sectional view of a drive shaft for a gear-driver adapter with keyed components aligned to engage the gears of a gear holder.

FIG. 12a is a cross-sectional view showing keyed components of an exemplary gear-driver adapter 100 aligned to engage gears 75a, 75b, 75c of gear holder 70 to generate an output gear ratio of 3:1.

Drive shaft 50 is released into a rear position such that spring 87 is able to provide a rearward pressure on key stop 80, causing it to engage gear holder 70. Spring 98, which is housed within ball driver 120 when assembled, exerts a rearward pressure on key stop 90, which causes key stop 90 to engage retaining balls 130a, 130b, 130c, 130d, 130e, 130f, 130g, 130h of ball driver 120.

As drive shaft 50 is rotated, key stop 80 follows and causes gear holder 70 to rotate as well. The rotation of gear holder 70 causes gears 75a, 75b, 75c to rotate about ball driver 120 and within main gear body 150, which has an inner surface containing a plurality of teeth (not shown) corresponding to the teeth of gears 75a, 75b, 75c, causing ball driver 120, and subsequently key stop 90, to rotate as well.

Because gears 75a, 75b, 75c act as driving gears, ball driver 120 acts as the driver gear, and the number of teeth on each of gears 75a, 75b, 75c, ball driver 120 and main gear house 150, the resulting gear ratio is 3:1, meaning for every one turn of drive shaft 50, and therefore gear holder 70, ball driver 120 turns three times.

Figure 12B:
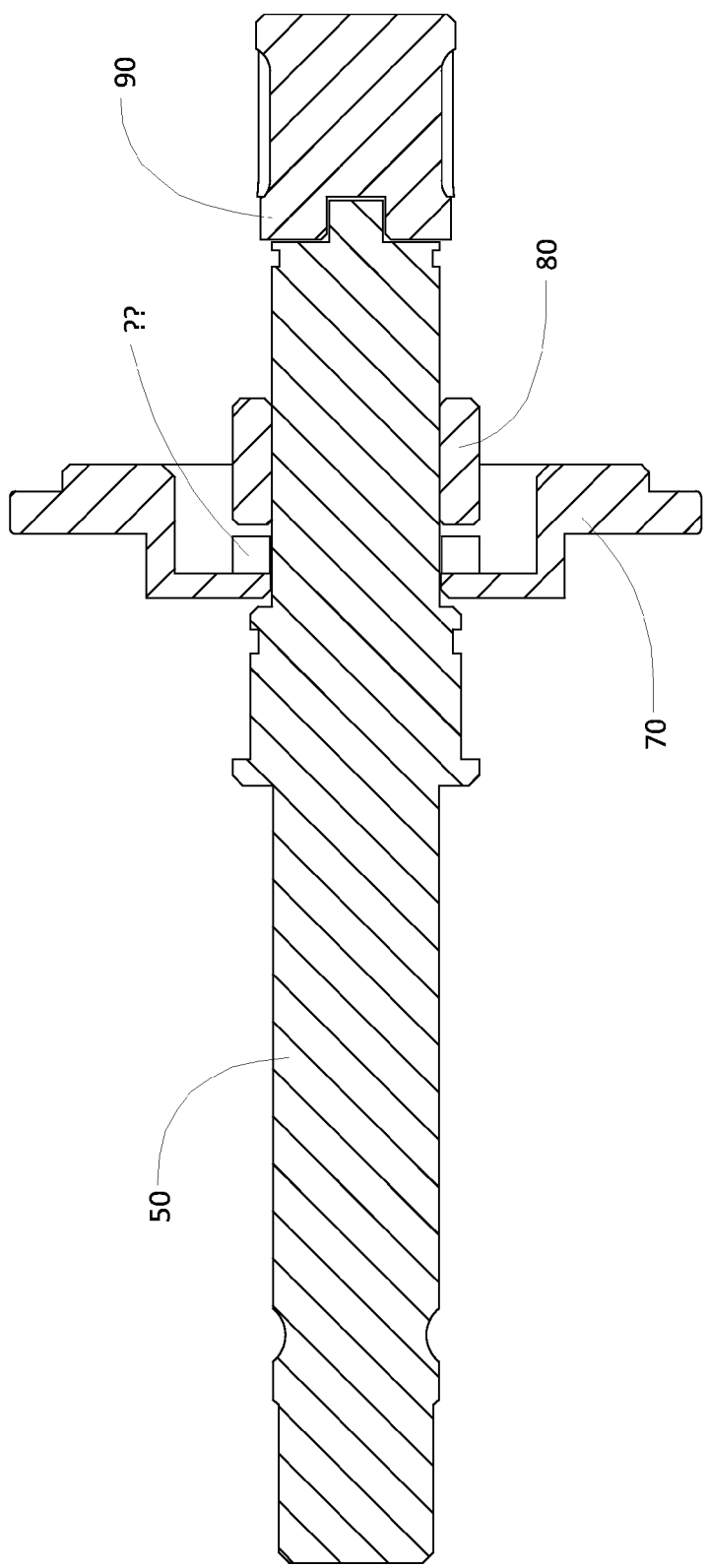
FIG. 12b is a cross-sectional view of a drive shaft for a gear-driver adapter with keyed components aligned to not engage the gears of a gear holder.

FIG. 12b is a cross-sectional view showing an exemplary gear-driver adapter 100 with keyed components aligned to bypass gears 75a, 75b, 75c of gear holder 70 to generate an output gear ratio of 1:1.

Forward pressure exerted by cover 20 (not shown) causes drive shaft 50 to be pushed forward, pushing key stop 80 forward and disengaging it from gear holder 70. Keyed front end 57 of drive shaft 50 engages key stop 90, which engages retaining balls 130a, 130b, 130c, 130d, 130e, 130f, 130g, 130h of ball driver 120.

As drive shaft 50 rotates, key stop 80 rotates with drive shaft 50, but does not rotate gear holder 70. Drive shaft 50 also causes key stop 90 to rotate, which causes ball driver 120 to rotate. Because gear holder 70 is, in essence, bypassed, the resulting output rotation from ball driver 120 is equal to the input rotation.

Because gear holder 70, and therefore gears 75a, 75b, 75c, are bypassed, the resulting gear ratio is 1:1, meaning for every one turn of drive shaft 50, ball driver 120 also completes one turn.

When being positioned back to the 3:1 gear ratio position, the shape of keyed protuberances 79a, 79b, including the self-aligning transitions 78 allows key stop 80 to quickly align with and engaged keyed protuberances 79a, 79b, regardless of the position of any handle or tool connected to gear-driver adapter 100 (not shown), with very little maneuvering, if any.

Figure 13:
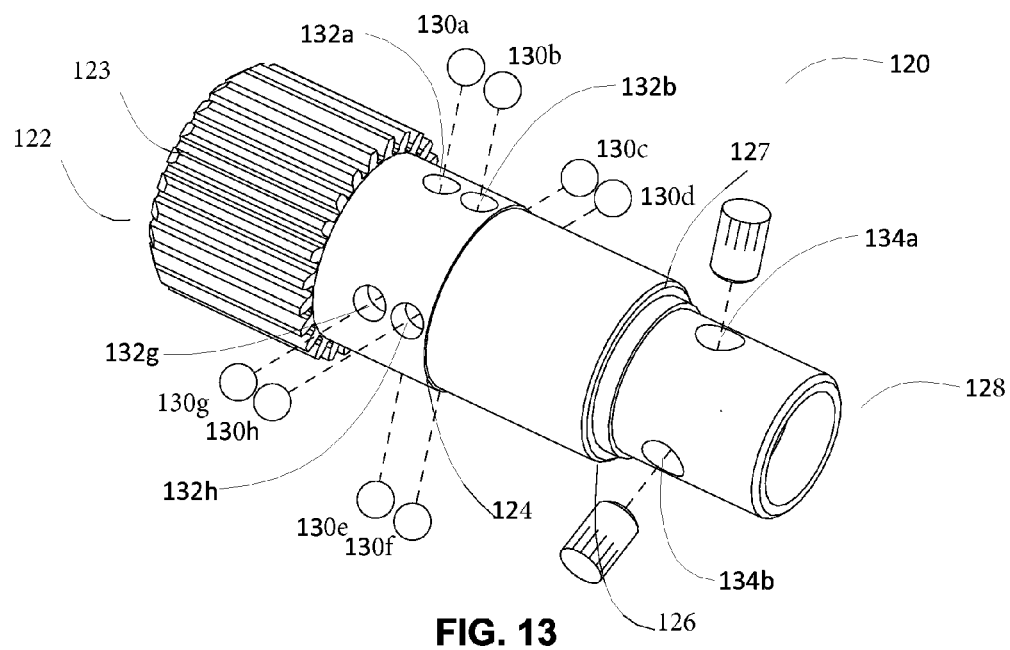
FIG. 13 illustrates an exemplary ball driver for a gear-driver adapter.

FIG. 13 illustrates an exemplary ball driver 120 for a gear-driver adapter 100. Ball driver 120 includes toothed portion 122 with outer teeth 123, smooth surface 124 with retaining ball apertures 132a, 132b, 132g, 132h (132c, 132d, 132e, 132f not shown), each to engage one retaining ball 130a, 130b, 130c, 130d, 130e, 130f, 130g, 130h, transitional surface 126, transitional chamfer 127 and narrow rear portion 128 containing locking pin apertures 134a, 134b.

In the exemplary embodiment shown, toothed portion 122 has an outer diameter which corresponds to the diameter created by gears 75a, 75b, 75c (not shown) on gear holder 70. Teeth 123 of ball driver 120 correspond to the teeth on gears 75a, 75b, 75c (not shown) such that rotation of gears 75a, 75b, 75c (not shown) causes rotation of ball driver 120 or vice versa. Ball driver 120 also provides output rotation which ultimately drives a tool attached to gear-driver adapter 100 (not shown). Ball driver 120 acts as a central, or sun, gear in the epicyclic gearing system created by gears 75a, 75b, 75c (not shown), ball driver 120 and main gear body 150 (not shown).

Smooth surface 124 has an outer diameter approximately equal to the outer diameter of toothed portion 122 without teeth 123. Retaining ball apertures 132a, 132b, 132g, 132h (132c, 132d, 132e, 132f not shown) are symmetrically disposed around smooth surface 124 in pairs (132a, 132b; 132c, 132d; 132e, 132f; and 132g, 132h). However, in further exemplary embodiments, ball driver 120 may contain more or fewer retaining ball apertures 132a-h, and retaining ball apertures 132a-h may be asymmetrically arranged around ball driver 120.

Retaining ball apertures 132a-h have a contoured interior surface such that the outer diameter of retaining ball apertures 132a-h is larger than the interior diameter of retaining ball apertures 132a-h. The interior diameter of retaining ball apertures 132a-h is also smaller than the diameter of retaining balls 130a-h so that retaining balls 130a-h do not fall through and disengage retaining ball apertures 132a-h. The larger outer diameter of retaining ball apertures 132a-h allows retaining balls 130a-h to remain freely rotatable in retaining ball apertures 132a-h.

When gear-driver adapter 100 (not shown) is assembled, a sleeve may be placed over retaining balls 130a-h in retaining ball apertures 132a-h to prevent retaining balls 130a-h from falling outward from retaining ball apertures 132a-h.

Figure 14:
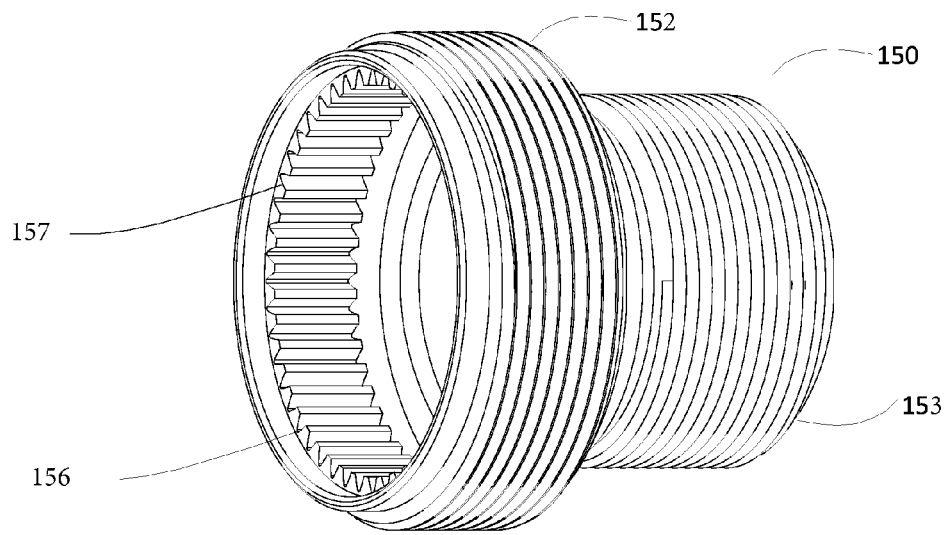
FIG. 14 illustrates an exemplary main gear body for a gear-driver adapter.

FIG. 14 illustrates an exemplary main gear body 150 for a gear-driver adapter 100 (not shown). Main gear body 150 has threaded outer surface 152 which secures main gear body 150, and therefore gear-driver adapter 100, to a handle. Cover-engaging surface 153 secures main gear body 150 to cover 20 (not shown). In the exemplary embodiment shown, cover-engaging surface 153 is threaded, with cover 20 (not shown) having corresponding threads. However, in further exemplary embodiments, cover-engaging surface 153 may secure to cover 20 (not shown) through any method known in the art, including clips, contours, and other structures.

Main gear body 150 also includes inner gear surface 156 which contains a plurality of teeth 157. Teeth 157 correspond to the teeth of gears 75a, 75b, 75c (not shown) and acts as a fixed ring gear in the epicyclic gear system created by gears 75a, 75b, 75c (not shown), ball driver 120 (not shown).

Figure 15:
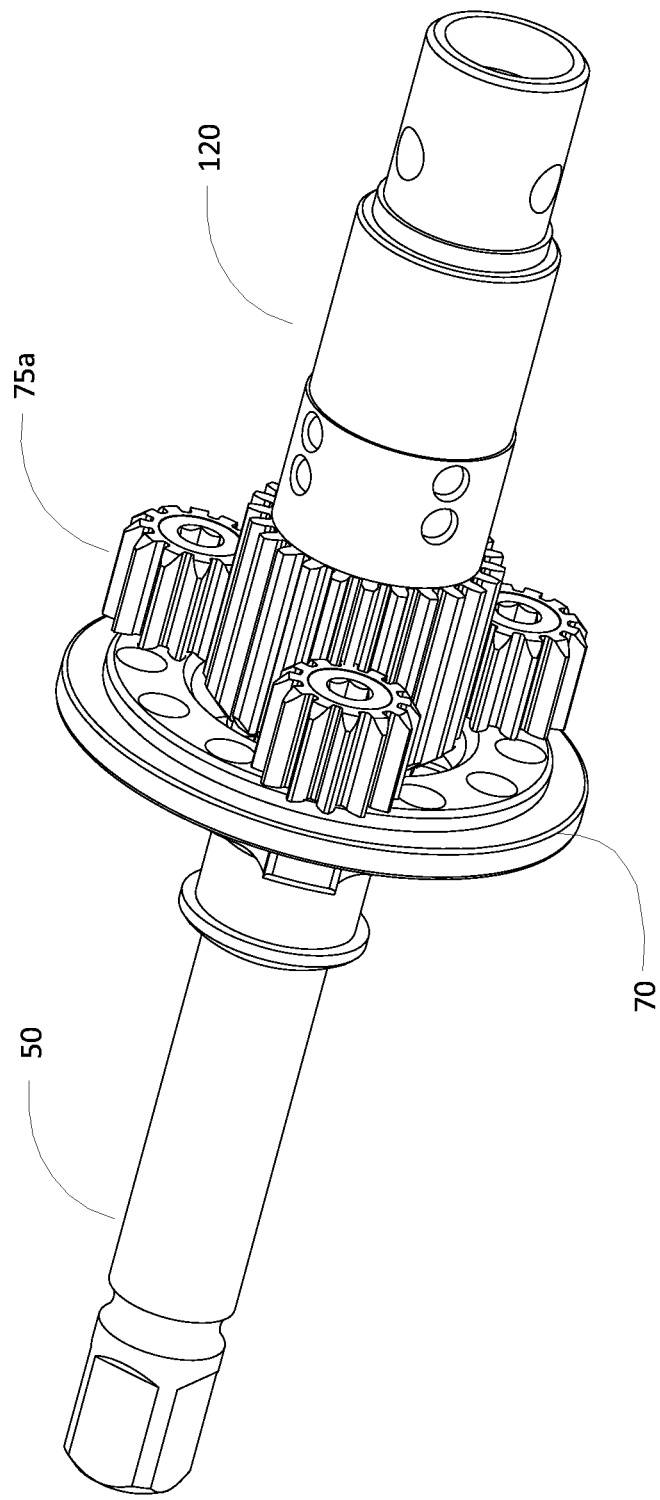
FIG. 15 is a view of an exemplary drive shaft for a gear-driver adapter assembled with a gear holder, ball driver and main gear body.

FIG. 15 is a view of an exemplary drive shaft 50 for a gear-driver adapter 100 assembled with a gear holder 70, ball driver 120 and main gear body 150.

Figure 16A:
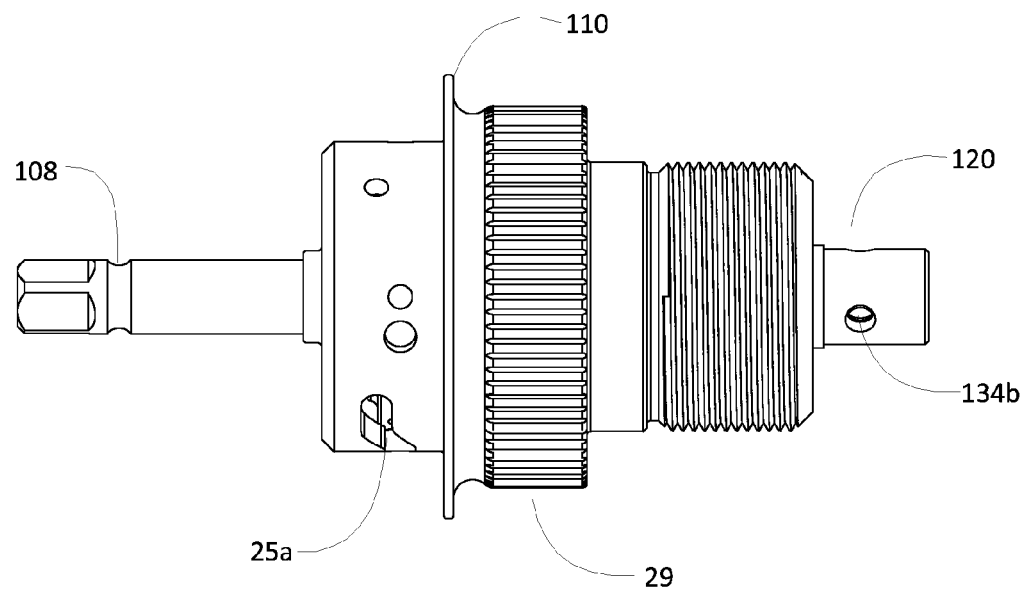
FIGS. 16a and 16b illustrate a partially assembled gear-driver adapter with a main gear body engaging a cover.
Figure 16B:
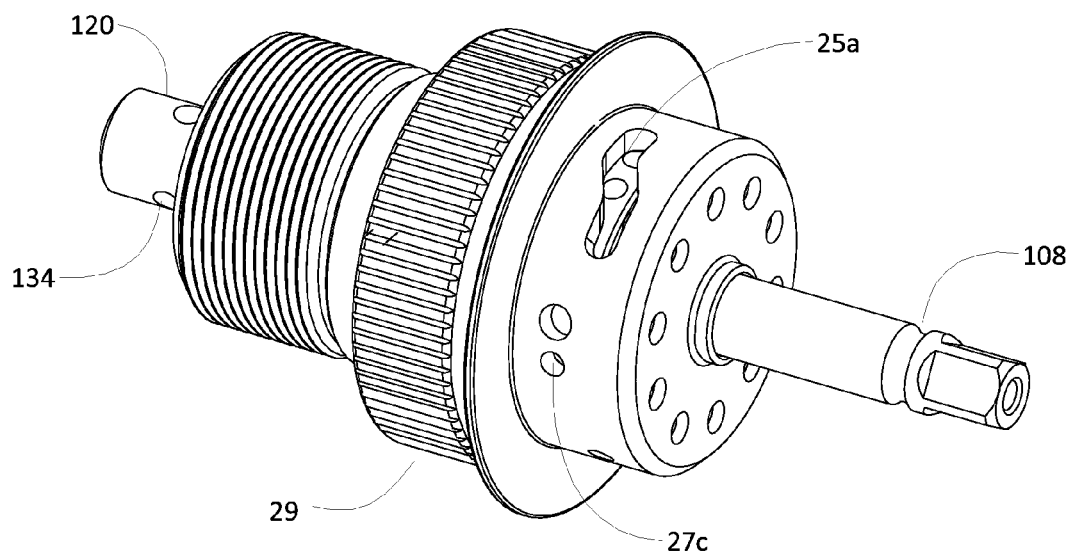

FIGS. 16a and 16b illustrate a partially assembled gear-driver adapter 100 with a main gear body 150 engaging cover 20.

Figure 17:
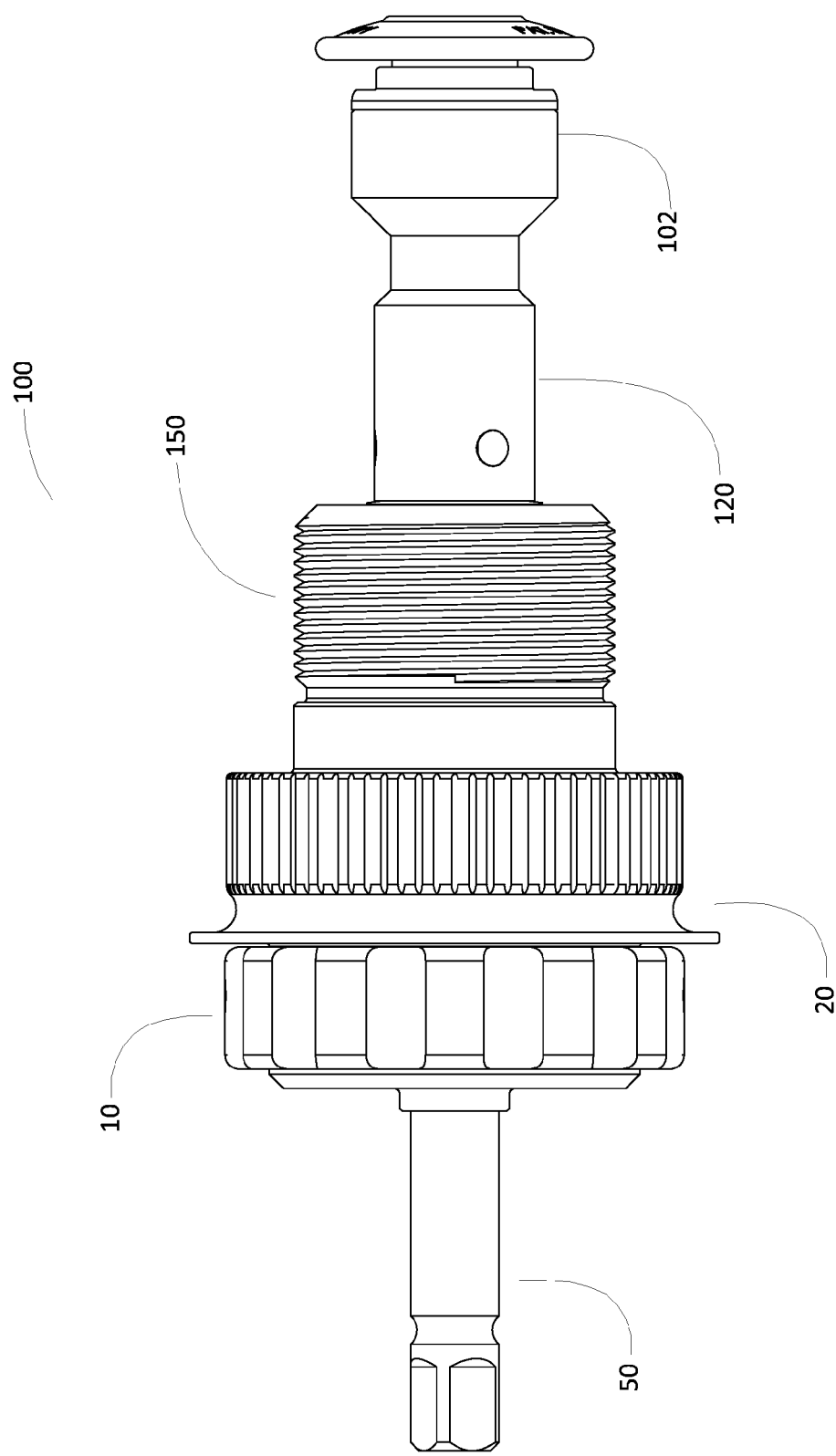
FIG. 17 illustrates an exemplary gear-driver adapter fully assembled without a gripping handle.

FIG. 17 illustrates an exemplary gear-driver adapter 100 fully assembled without a gripping handle 105 (not shown).

Figure 18:
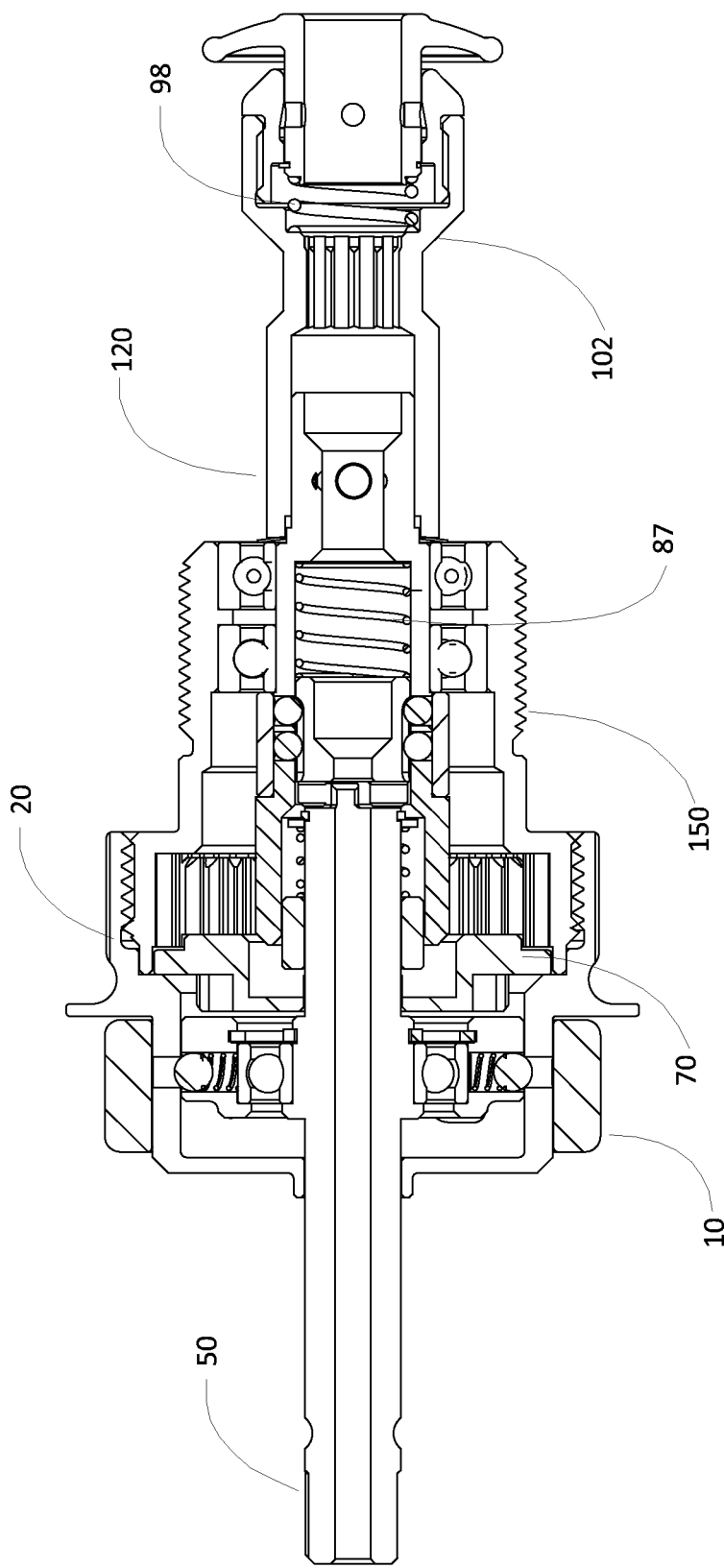
FIG. 18 illustrates a cross-sectional view of an exemplary gear-driver adapter fully assembled without a gripping handle.

FIG. 18 illustrates a cross-sectional view of an exemplary gear-driver adapter fully assembled without a gripping handle.

Figure 19:
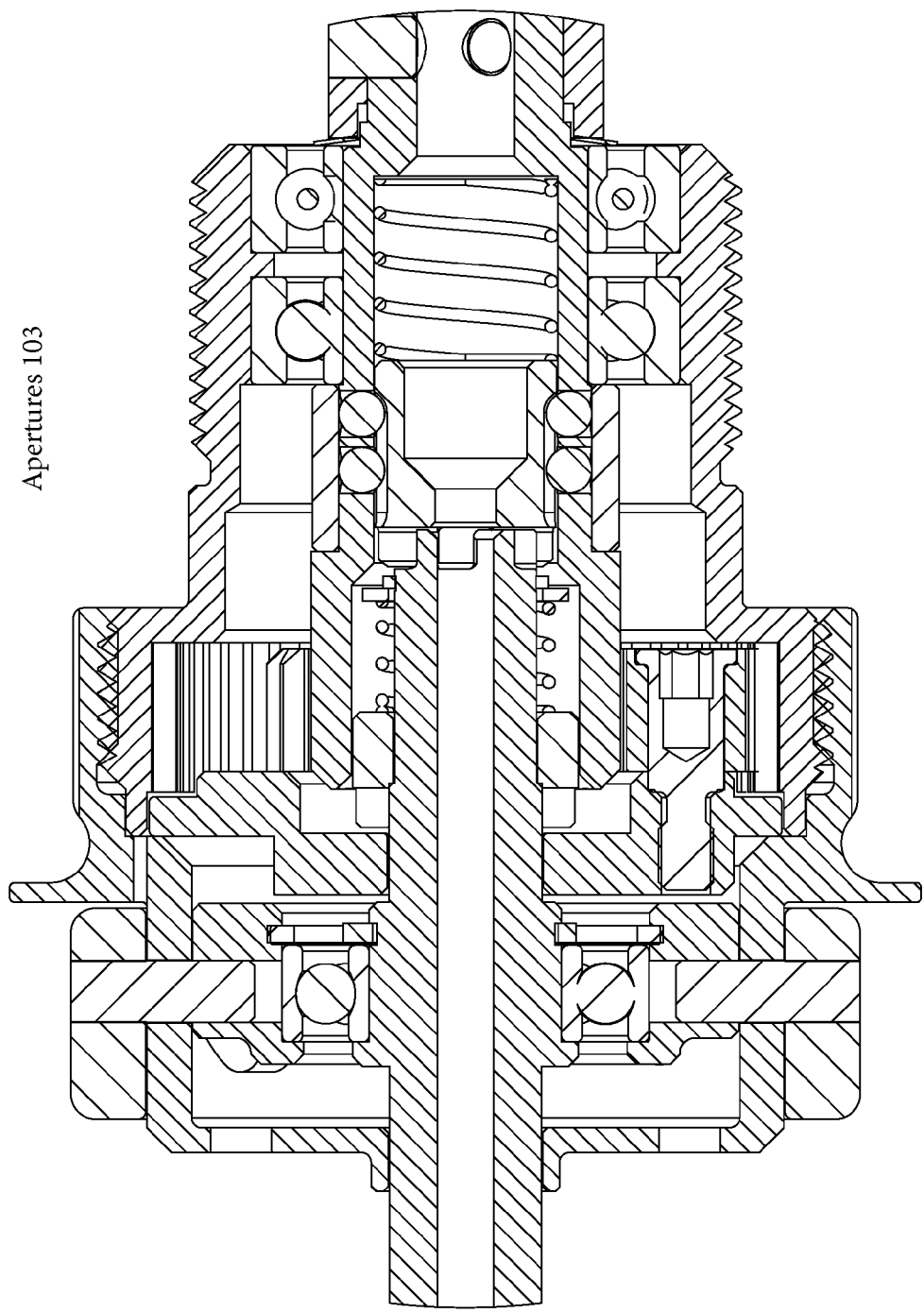
FIG. 19 illustrates a cross-sectional area in FIG. 18.

FIG. 19 illustrates a cross-sectional area in FIG. 18. As illustrated, pins 11a, 11b engage selection ring 10 and cover 20 to transition gear driver adapter 100 between its gear ratio positions. Switch 40 with securing balls 46a, 46b (not shown) secures cover 20 and switch 40 in position to prevent accidental changing of gear ratio while in use.

Drive shaft 50 is engaged with key stop 90, and key stop 80 engages gear holder 70 with gears 75a (75b, 75c not shown) so that, in the exemplary embodiment shown, gear-driver adapter 100 is shown in its 3:1 gear ratio position. In further exemplary embodiments, the number of gears 75, and the number of teeth on gears 75, ball driver 120 and main gear body 150 may provide different gear ratios.

Retaining rings 64, 66, as well as the contours of drive shaft 50, prevent movement of switch 40 along drive shaft 50. In further exemplary embodiments, additional retaining rings or other securing structures, such as contours, clips and clasps, may be present to prevent unwanted movement of components of gear-driver adapter 100.

Spring 87, washer 88 and retaining ring 89 are secured between key stop 80 and key stop 90, and key stop 90 secures spring 98 within ball driver 120. Washer 88 and retaining ring 89 help secure spring 87 and provide a surface against which spring 87 may press when drive shaft 50 is moved between gear ratio positions. In other exemplary embodiments, washer 88 and retaining ring 89 may be omitted or replaced by any structure known in the art to secure a spring.

Retaining balls 130a-h are shown engaging key stop 90, with sleeve 140 securing retaining balls 130a-130h in ball driver 120. Bearing 145 is secured after sleeve 140 on ball driver 120.

Locking pins 135 engage locking apertures 103 (not shown) in tool adapter 102 to rotate tool adapter 102 with ball driver 120.

Main gear body 150 houses bearing 160 and wave spring 164. Bearing 160 facilitates rotational movement of ball driver 120 and tool adapter 102, while wave spring 164 helps distribute pressures. Other exemplary embodiments may omit bearing 160 and wave spring 164 or replace one or both structures with any other structure known in the art to facilitate rotational movement or distribute pressures.

Figure 20:
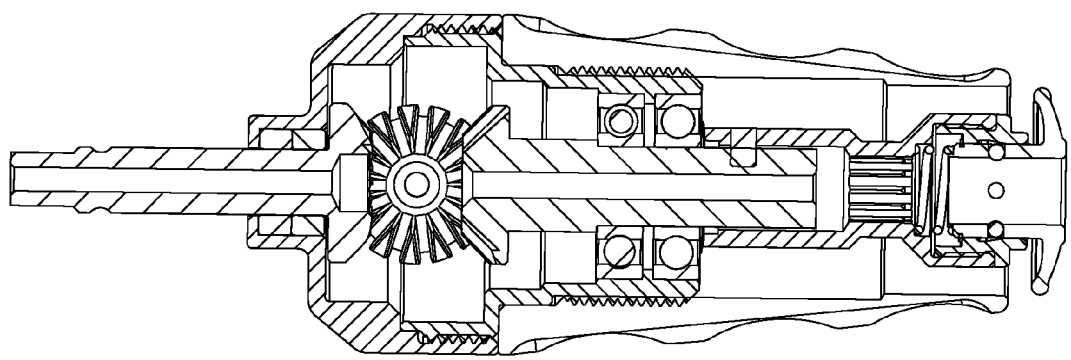
FIG. 20 is a cross-sectional view of an alternative embodiment of a gear-driver adapter.

FIG. 20 illustrates an alternative embodiment of a gear-driver adapter 100 using bevel gears 250, 251, 252.

Figure 21:
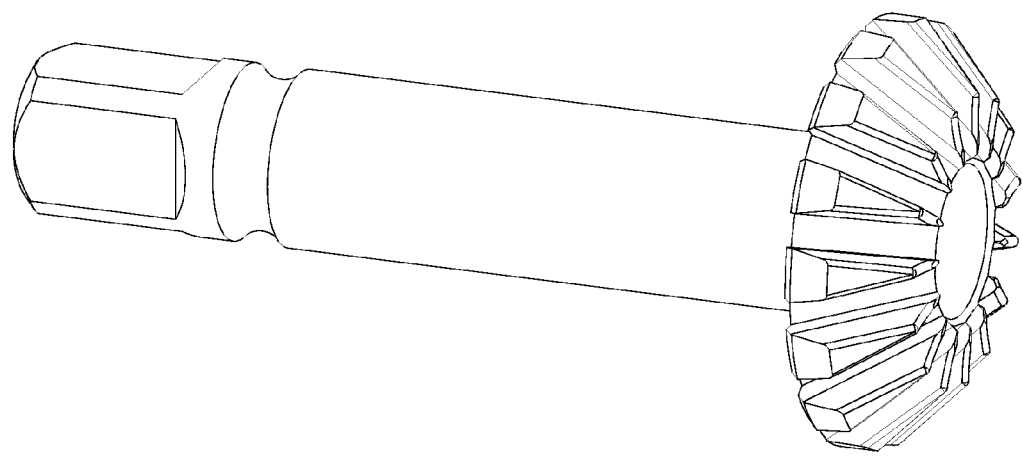
FIGS. 21 through 25 illustrate alternative exemplary drive shafts with different handle securing structures.
Figure 22:
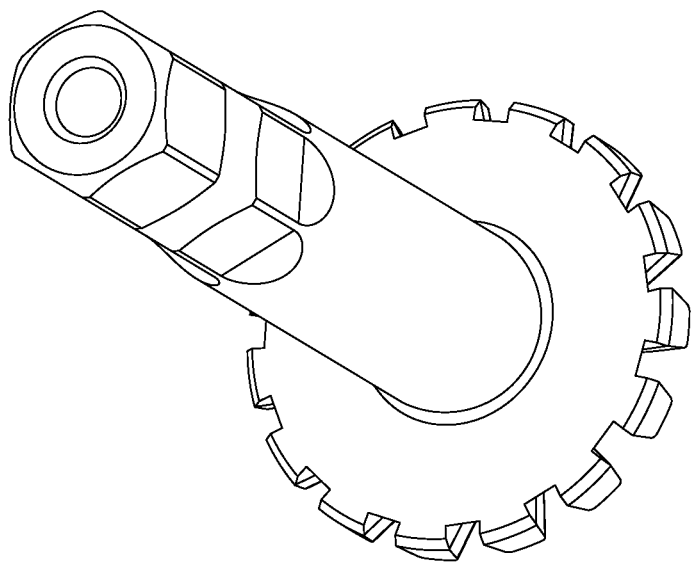
Figure 23:
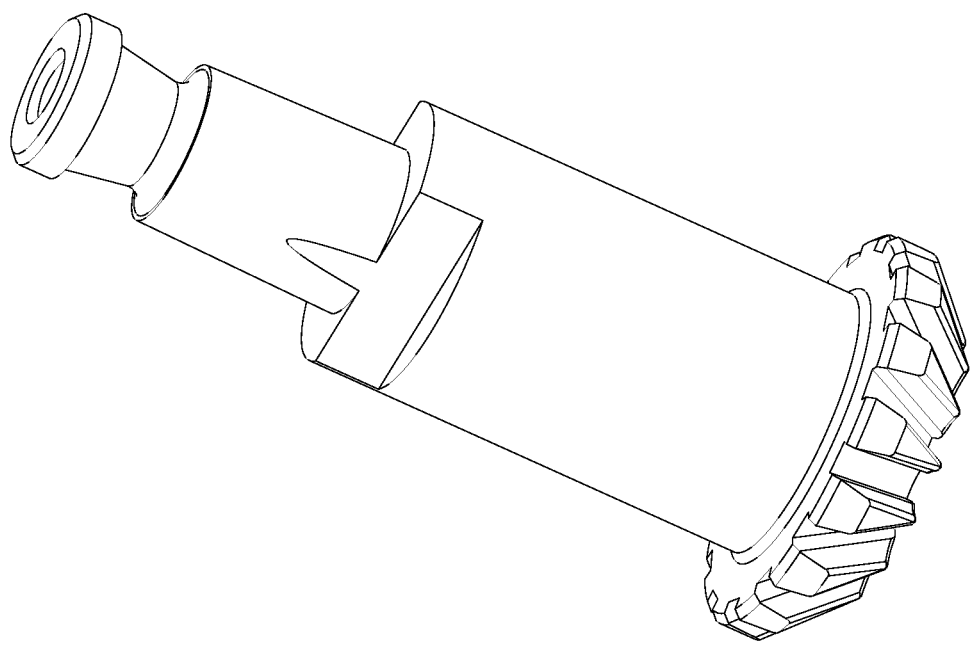
Figure 24:
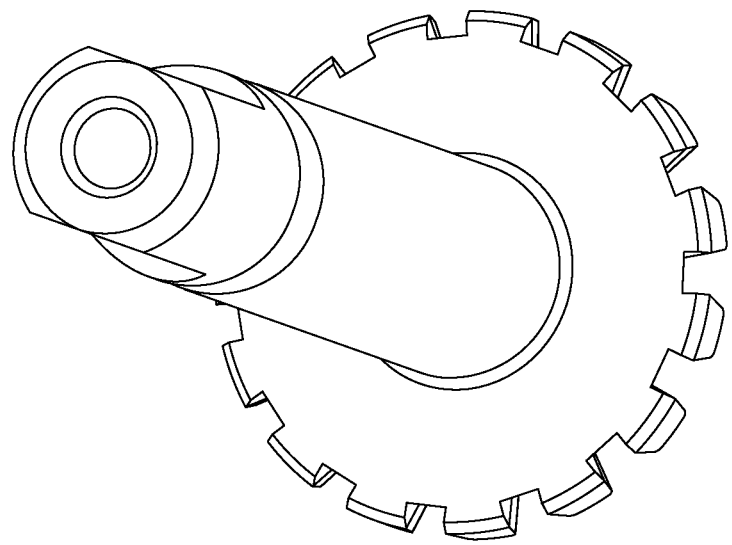
Figure 25:
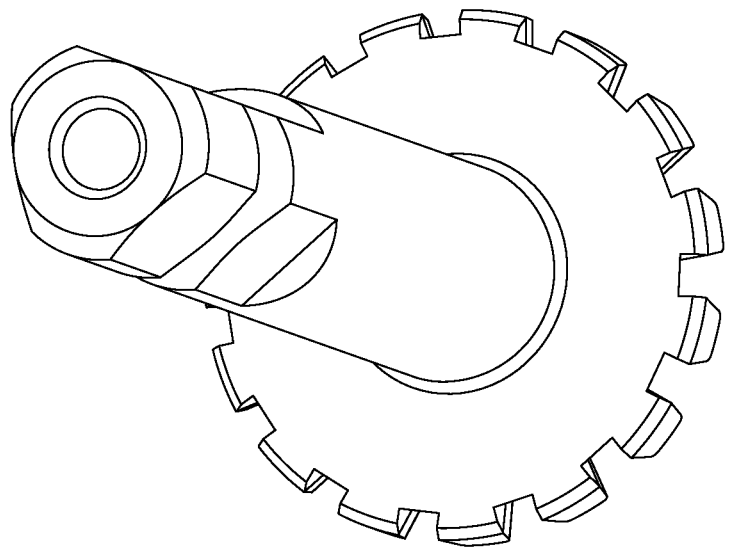

FIGS. 21 through 25 illustrate alternative exemplary drive shafts with different handle securing portions 106. FIG. 21 illustrates a square handle securing portion 106 with bevel gear 250. FIG. 22 illustrates a hex handle securing portion 106. FIG. 23 illustrates a Hudson handle securing portion 106. FIG. 24 illustrates a double flat handle securing portion 106. FIG. 25 illustrates a tri-lobe handle securing portion 106. While in the exemplary embodiments shown in FIGS. 21-25, each alternative handle securing portion 106 is shown with bevel gear 250, these and other configurations of handle securing portion 106 may be used with drive shaft 50 (not shown) in an epicyclic gear system.

What is claimed is:

1. A variable speed gear driver system comprised of:
A variable speed gear driver adapter system comprised of
a cover enclosing a variable gear assembly including at least two gears and at least one main gear drive shaft and a ball driver,
said main gear drive shaft having a first end and a second end, said second end having a first keyed structure and a second keyed structure;
a tool adapter wherein said tool adaptor is adapted with apertures to engage said ball driver, wherein said ball driver has engaging locking pins which are adapted to securely engage at said at least one tool adapter;
an interchangeable handle having an contoured interior chamber which has one or more recessed engaging contours to receive and securely engage a plurality of geometrically corresponding flattened protrusions on said main gear drive shaft;
a gear holder including a third keyed structure;
a first key stop having a fourth keyed structure corresponding to said third keyed structure and a fifth keyed structure corresponding to said second keyed structure;
a second key stop having a sixth keyed structure corresponding to said first keyed structure; and
a first spring secured between said first and second key stops and a second spring secured between said second key stop and said ball driver.

2. The system of claim 1 wherein said first end of said main gear drive shaft has a handle-securing adapter portion, wherein said first and second ends of said main gear drive shaft are separated by a shaft.

3. The system of claim 2 which further includes a switch assembly operatively coupled with said gear assembly to selectively engage said gears.

4. The system of claim 3 which wherein said switch assembly has a first position and a second position along said shaft of said handle-securing portion.

5. The system of claim 3 wherein said variable gear assembly is comprised of:
said gear holder securing said at least two gears, wherein said at least two gears have outer teeth,
said ball driver having an outer surface containing a plurality of teeth, wherein said teeth correspond to said outer teeth of said gear holder gears, and
a main gear body having an inner surface with a plurality of teeth corresponding to said outer teeth of said gear holder gears; and
said tool adapter secured to said ball driver.

6. The system of claim 5 wherein said fourth keyed structure engages said third keyed structure when said switch is in a first position.

7. The system of claim 5 wherein said first and sixth keyed structures, said second and fifth keyed structures and said third and fourth keyed structures are engaged when said switch is in a first position.

8. The system of claim 5 wherein only said first and sixth keyed structures and said second and fifth keyed structures are engaged when said switch is in a second position.

9. The system of claim 5 wherein said first keyed structure is a pair of protuberances.

10. The system of claim 5 wherein said sixth keyed structure is at least one keyed recess.

11. The system of claim 5 wherein said second keyed structure is a plurality of flattened surfaces.

12. The system of claim 5 wherein said fifth keyed structures is a plurality of flattened surfaces.

13. The system of claim 5 wherein said third keyed structure is a pair of keyed protuberances.

14. The system of claim 5 wherein said fourth keyed structure is a plurality of keyed recesses.

15. The system of claim 5 wherein said switch assembly further includes
at least two securing ball apertures, each securing a spring and a securing ball, wherein said cover prevents said securing balls from disengaging said securing ball apertures,
at least two segmented slots, and
a selector ring containing at least two pins, each of said at least two pins corresponding to one of said at least two slots.

16. The system of claim 15 wherein said at least two segmented slots are approximately S-shaped having two substantially straight segments separated by a middle angled transition segment, wherein each of said substantially straight segments corresponds to one of said two selectable switch positions.

17. The system of claim 1 wherein said tool adapter is secured to said ball driver with a plurality of pins.

* * * * *